(12) United States Patent
Ogasawara et al.

(10) Patent No.: US 7,793,129 B2
(45) Date of Patent: Sep. 7, 2010

(54) POWER CONSUMPTION DECREASE MEMORY MANAGEMENT METHOD

(75) Inventors: Katsuhisa Ogasawara, Kawasaki (JP); Yumiko Sugita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 741 days.

(21) Appl. No.: 11/729,957

(22) Filed: Mar. 30, 2007

(65) Prior Publication Data
US 2007/0288783 A1    Dec. 13, 2007

(30) Foreign Application Priority Data
Mar. 31, 2006    (JP)    ............... 2006-097586

(51) Int. Cl.
G06F 1/00    (2006.01)
G06F 1/32    (2006.01)
(52) U.S. Cl. .................. 713/323; 713/320; 713/324
(58) Field of Classification Search ............ 713/323
See application file for complete search history.

(56) References Cited

U.S. PATENT DOCUMENTS

| | | | |
|---|---|---|---|
| 5,404,531 A * | 4/1995 | Wakatani | .......... 717/146 |
| 6,215,714 B1 | 4/2001 | Takemae et al. | |
| 6,671,815 B2 | 12/2003 | Iwamura et al. | |
| 6,954,837 B2 | 10/2005 | Woo et al. | |
| 7,454,639 B2 * | 11/2008 | Jain et al. | .......... 713/324 |
| 2004/0193775 A1 * | 9/2004 | Van Doren et al. | .......... 711/1 |

FOREIGN PATENT DOCUMENTS

JP    2005-235203 A    9/2005

* cited by examiner

*Primary Examiner*—Suresh K Suryawanshi
(74) *Attorney, Agent, or Firm*—McDermott Will & Emery LLP

(57) ABSTRACT

The power consumed by a memory is reduced without affecting the performance whereby a processor accesses the memory. A state of a power supplied to the memory is controlled to one of an active state wherein a storage area included in the memory rank can be accessed from the processor, and an inactive state wherein access cannot be performed without a delay for each memory rank, the basic system software prevents fragmentation in which the allocated storage area spans a plurality of memory ranks, puts the power state of a memory rank which does not include an allocated storage area into the inactive state, and puts the power state of a memory rank which includes a storage area required for allocation first into the active state.

8 Claims, 20 Drawing Sheets

| POWER MODE | POWER CONSUMPTION | MODE CHANGE-OVER LATENCY |
|---|---|---|
| $PS_0$ POWER MODE 0 (STANDBY) | $X_0$ | POWER MODE 0 : 0<br>POWER MODE 1 : $Y_{0,1}$<br>POWER MODE 2 : $Y_{0,2}$ |
| $PS_1$ POWER MODE 1 (POWER-DOWN) | $X_1$ | POWER MODE 0 : $Y_{1,0}$<br>POWER MODE 1 : 0<br>POWER MODE 2 : NOT VALID |
| $PS_2$ POWER MODE 2 (SELF-REFRESH) | $X_2$ | POWER MODE 0 : $Y_{2,0}$<br>POWER MODE 1 : NOT VALID<br>POWER MODE 2 : 0 |

*FIG. 5*

| MEMORY ZONE 2120 | ADDRESS RANGE 6010 | POWER RANK ZONE 6020 | POWER RANK ZONE SIZE 6030 | POWER STATE 6040 | NUMBER OF UNUSED MEMORY PAGE FRAMES 6050 | NUMBER OF UNUSED MEMORY PAGE FRAMES LEVEL 1 TIME DIFFERENTIAL 6060 | NUMBER OF UNUSED MEMORY PAGE FRAMES LEVEL 2 TIME DIFFERENTIAL 6070 |
|---|---|---|---|---|---|---|---|
| Zone0 | 6081 ~ 0~$X_0$ | $PR_0$ | $RS_0$ | $PS_0$ | $Su_0$ | $Su'_0$ | $Su''_0$ |
| | 6082 | ... | ... | ... | ... | ... | ... |
| | | $PR_{x0}$ | $RS_{x0-0}$ | $PS_{x0}$ | $Su_{x0}$ | $Su'_{x0}$ | $Su''_{x0}$ |
| Zone1 | 6091 ~ $X_0$~$X_1$ | $PR_{x0}$ | $RS_{x0-1}$ | $PS_{x0}$ | $Su_{x0}$ | $Su'_{x0}$ | $Su''_{x0}$ |
| | 6092 | ... | ... | ... | ... | ... | ... |
| | | $PR_{x1}$ | $RS_{x1-0}$ | $PS_{x1}$ | $Su_{x1}$ | $Su'_{x1}$ | $Su''_{x1}$ |
| Zone2 | 6101 ~ $X_1$~$X_2$ | $PR_{x1}$ | $RS_{x1-1}$ | $PS_{x1}$ | $Su_{x1}$ | $Su'_{x1}$ | $Su''_{x1}$ |
| | 6102 | ... | ... | ... | ... | ... | ... |
| | | $PR_n$ | $RS_n$ | $PS_n$ | $Su_n$ | $Su'_n$ | $Su''_n$ |

FIG. 6

| POWER RANK ZONE 2160 | NUMBER OF RELEASE CANDIDATE MEMORY PAGE FRAMES 9100 | NUMBER OF REMAINING USED MEMORY PAGE FRAMES 9200 |
|---|---|---|
| $PR_i$ | $P_j$ | $D_j$ |
| ... | ... | ... |
| $PR_l$ | $P_m$ | 0 |
| ... | ... | ... |
| $PR_p$ | $P_q$ | $D_q$ |

POWER CONSUMPTION DECREASE MEMORY MANAGEMENT METHOD

CLAIM OF PRIORITY

The present application claims priority from Japanese patent application P2006-97586 filed on Mar. 31, 2006, the content of which is hereby incorporated by reference into this application.

BACKGROUND OF THE INVENTION

This invention relates to a method of managing the memory of a computer system, and a method of reducing the power consumption of a memory, taking particular account of access performance.

An ordinary computer system is provided with hardware and consumes power due to the operation of the hardware. Specifically, hardware means a processing unit (processor), a main memory unit (memory), a secondary storage, and an Input/Output (I/O) device, etc.

When a computer system consumes a large amount of power, the computer system simultaneously generates a lot of heat. Therefore, a cooling installation from which heat is removed must be installed. Due to the high cost of the power consumed by the computer system and the cooling installation is high, when a large-scale computer system is constructed, the system design must take account of the computer performance per power consumption. Hence, a large-scale computer system needs to be designed with a view to reducing power consumption. Since modular devices in the system also have conditions such as the limit of battery capacity, it is necessary to aim to reduce power consumption in these devices too. In a computer system, memory is one such device which consumes power in large amounts. For example, since a large-scale computer system has a very large memory, the proportion of the memory power consumption in the power consumption of the whole computer system is high. The capacity of the memory with which a computer server, a personal computer and modular devices are provided, is also increasing.

The main targets of power consumption are the processor and peripheral devices, and almost no control is performed to reduce the power consumption of the memory. However, from now on, the memory will also be the target of power consumption reduction efforts.

In general, the memory stores commands for the processor to perform calculations, as well as data, etc. Specifically, the processor reads an operating system (OS) or application software from a secondary storage to the memory. The processor reads commands from the memory and performs calculations.

When the processor performs calculations, the memory stores the data required for calculations and the data based on calculations or results.

The memory of a computer system is usually a DRAM (Dynamic Random Access Memory). A DRAM has a transistor and a capacitor, and data is recorded by whether an electric charge is stored in the capacitor. Specifically, when the capacitor stores a charge, "1" is stored, and when the capacitor does not store a charge, "0" is stored. Due to this construction, the charge with which the DRAM is charged by the capacitor is decreased, so in order to maintain the recorded data, refresh must be executed periodically which returns the state of the capacitor to the charged state.

Further, the DRAM can have plural power control management modes, and can usually change to another mode via a memory controller or the like. For example, it can change from a normal mode to a low power mode.

In the low power mode, although power consumption is low compared with the normal mode, the speed with which the processor accesses the memory decreases.

A prior art computer system is known wherein a memory controller has a logical/physical address translation table, and the controller operates the translation table so that the used memory area can be concentrated in any desired memory.

Also, a low power control method is known in which an unused memory list is managed for each memory device by the OS, and memory is allocated memory starting from memory devices which have little unused memory (memory usage is high) (e.g., refer to U.S. Pat. No. 6,954,837). By this process, the memory controller changes over the power mode of an unused memory device to the low power mode, and the power consumption of the memory devices can be reduced.

Another technique is known wherein the power consumption of memory devices is controlled by periodically refreshing only memory devices storing data, and holding the data (e.g., refer to U.S. Pat. No. 6,215,714).

In another technique (e.g., refer to JP 2005-235203 A), instead of performing low power control of the memory, low power control of the processor is executed by detecting, in advance, a command which operates a computing circuit, activating this computing circuit, and after the computation by the computing circuit are completed, inactivating the used computing circuit.

SUMMARY OF THE INVENTION

In the prior art mentioned above, the main target of the low power control in a computer system was the processor, while on the other hand, the power consumption of the memory was hardly controlled until today. For example, the technique described in JP 2005-235203 A is related to low power consumption control of the computing circuit in a processor.

As mentioned above, U.S. Pat. Nos. 6,954,837 and 6,215,714 disclose a technique where control is executed to reduce the power consumed on a hardware level. In general, since physical memory resources are directly managed by basic system software (operating system, etc.), in practice, it is very difficult to realize effective low power control only at hardware without cooperating with basic system software. Even when there is assistance of software, such as basic system software, in a method where in a method where power supply to the memory device is simply interrupted in case of which the whole memory device is unused, and memory devices with a high usage frequency are allocated by a program, fragmentation occurs where the used physical memory area spans plural memory devices, which is not effective.

In particular, when the memory is managed by the operating system, fragmentation will usually occur. Moreover, when the power which a memory consumes is changed from a low power mode state to the normal power mode state in which memory write/read are possible, a delay (latency) occurs in accessing the memory from the processor, and the memory access performance of the processor falls.

In the technique disclosed in U.S. Pat. No. 6,954,837, physical memory is allocated from memory devices having a high usage frequency, and power consumed by unused memory devices is reduced. However, the methods of allocating memory and of releasing memory allocation are not forms of control which attempt to reduce the power consumption of the memory itself. For this reason, if the computer system continues running and the memory is managed by the operating system, the area where the physical memory is used usually becomes fragmented, and this method may not be possible to deal with this fragmentation.

The low power control technique disclosed in U.S. Pat. No. 6,954,837 is not compatible with a method where the operating system manages the memory by dividing the memory into zones (physical memory is divided into a low rank address area, normal address area and high rank address area), nor with the Numa (Non-Uniform Memory Access) configuration. Hence, the main storage device cannot fully comply with demands for low power control executed in assistance with the operating system. The latency produced by the change of power mode cannot be concealed.

In the technique disclosed in U.S. Pat. No. 6,215,714, on the other hand, the power consumed by memory devices can be suppressed by executing a refresh to the memory currently in use, to maintain only the data in the memory. But as described above, if the physical memory usage area becomes fragmented across memory devices, the memory device cannot be changed over to a low power mode, thus the reliability of low memory power consumption control is low.

According to one embodiment of this invention, there are provided a computer having at least one processor which executes basic system software, firmware and application software, a memory which is a storage area, and a memory controller coupled to the memory, wherein the memory controller controls a memory addressing which defines an address in the memory, a memory access from the processor to the memory and a memory power state, wherein the memory storage area is an area which can be assigned to the basic system software, the firmware and the application software, the storage area is divided into memory ranks which are units whose power can be independently controlled by the memory controller, wherein a supplied power state of the memory is controlled, for each memory rank, to one of an active state in which the storage area included in the memory rank can be accessed from the processor, and an inactive state in which access from the processor to the storage area is delayed; and wherein the basic system software prevents fragmentation in which the allocated storage area spans a plurality of memory ranks, puts the power state of a memory rank which does not include the allocated storage area into the inactive state via the memory controller, and puts the power state of a memory rank which includes a storage area required for the allocation first into the active state.

According to this embodiment of this invention, in a computer system comprising a main storage (memory), control can be performed to reliably reduce the power consumed by the memory without affecting the performance whereby the processor accesses the memory, and the power consumed by the memory can be largely reduced.

BRIEF DESCRIPTION OF THE DRAWINGS

The present invention can be appreciated by the description which follows in conjunction with the following figures, wherein:

FIG. 5 is a schematic diagram of a memory power mode table according to the first embodiment of the invention;

FIG. 6 is a schematic diagram of a memory zone-power rank zone state management table according to the first embodiment of the invention;

FIG. 9 is a schematic diagram of a power rank zone release candidate page table according to the first embodiment of the invention;

DETAILED DESCRIPTION OF THE PREFERRED EMBODIMENT

First embodiment

A first embodiment of the invention will now be described referring to FIG. 1 to FIG. 14.

Figure 1:
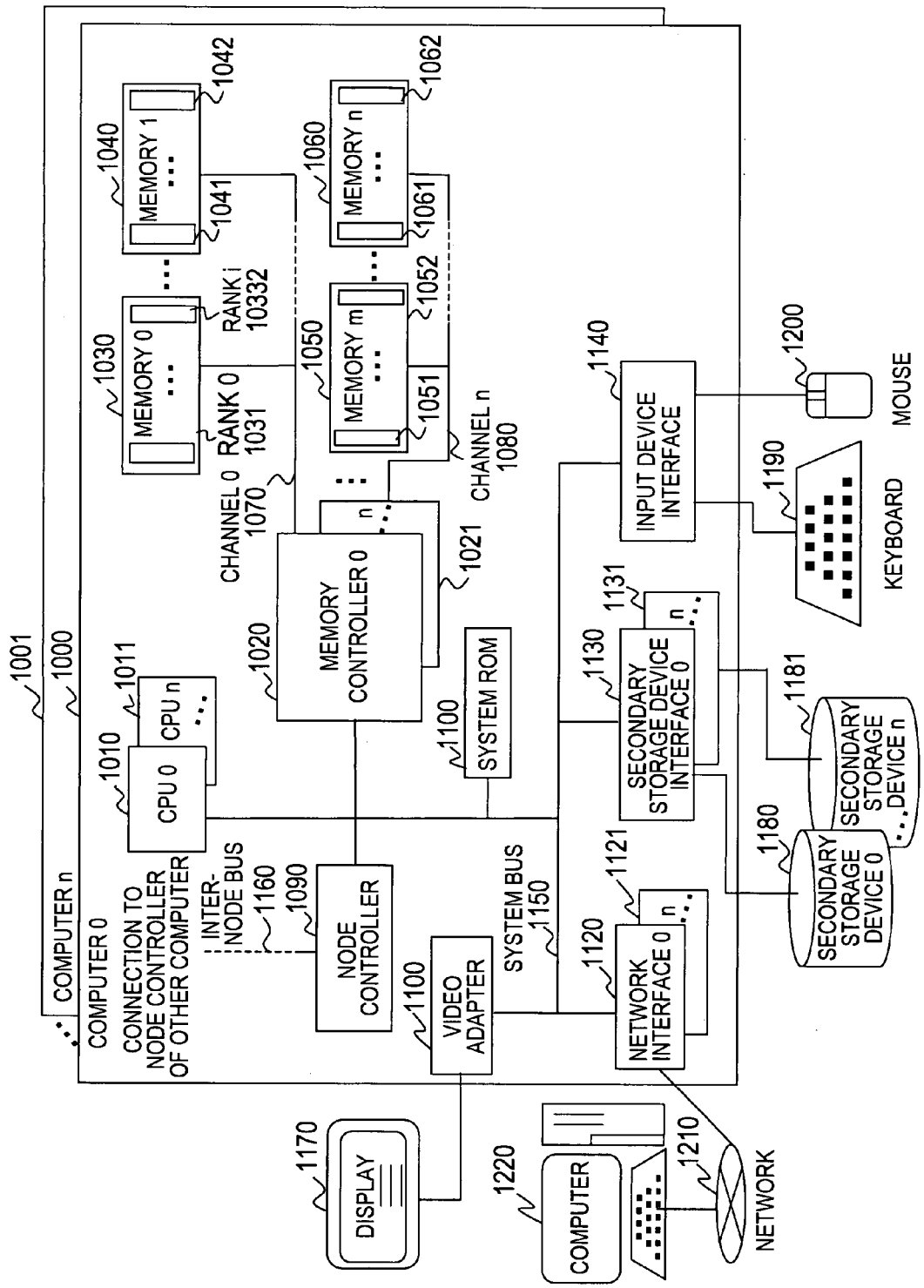
FIG. 1 is a schematic diagram of a computer system according to a first embodiment of the invention.

FIG. 1 is a schematic diagram of a computer system according to the first embodiment of the invention.

The computer system according to the first embodiment of the invention is provided with computers 1000 to 1001, a keyboard 1190, a mouse 1200, a display 1170, and secondary storages 1180 to 1181. The keyboard 1190, a mouse 1200, a display 1170, and the secondary storages 1180 to 1181 are connected to one or plural computers 1000 to 1001.

The computer 1000 comprises processors (CPU) 1010 to 1011, a memory controller 1020 to 1021, memories 1030 to 1060, a system ROM 1100, a video adapter 1110, network interfaces 1120 to 1121, secondary storage interfaces 1130 to 1131, and an input device interface 1140.

The processors (CPU) 1010 to 1011, memory controller 1020 to 1021, memories 1030 to 1060, system ROM 1100, video adapter 1110, network interfaces 1120 to 1121, secondary storage interfaces 1130 to 1131, and input device interface 1140 are connected by a system bus 1150.

The memory controller 1020 is connected to the memories 1030 to 1040 by a channel 1070, and to memories 1050 to 1060 via a channel 1080. The keyboard 1190 and mouse 1200 are connected to the computer 1000 via an input device interface 1140.

The CPU 1010 loads various programs from the memories 1030 to 1060, and executes the programs. The memory controllers 1020 to 1021 manage the memories 1030 to 1060.

The system ROM 1100 stores the firmware 2000 which provides basic control and basic information about the hardware with which the computer 1000 is provided.

The memories 1030 to 1060 primarily store various programs stored in the system ROM 1100 or the secondary storages 1180 to 1181. The memories 1030 to 1060 also primarily store data required for the CPU 1010 to execute the programs, the data after execution, and the execution results.

The memory 1030 is divided into memory ranks 1031 to 1032 which are storage elements of the minimum unit whose power can be independently controlled.

This is identical for the other memories 1040 to 1060.

The memory controllers 1020 to 1021 have at least a memory addressing function which allocates the memories 1030 to 1060 to memory addresses, a memory accessing function accessed by the CPU to 1011 to the memories 1030 to 1060, and a interface function which controls the power state of the memories 1030 to 1060.

The number of the computers 1000 of the computer system is arbitrary, and may be singular or plural. Moreover, the number of component elements in the computer 1000 is arbitrary, and may be singular or plural.

In the case of a computer system wherein the computer 1000 and the other computer 1001 share the memories 1030 to 1060, the computer 1000 and the computer 1001 are connected via a node controller 1090 and inter-node bus 1160 via a high speed communication circuit.

The computer 1000 is connected with the keyboard 1190 and mouse 1200 which are input devices via the input device interface 1140.

The computer 1000 is also connected with the display 1170 via the video adapter 1110.

The computer 1000 is connected to the secondary storage 1180 via the secondary storage interface 1130. The computer 1000 is connected to the network 1210 via the network interface 1120, and the computer 1000 communicates with the computer 1220 in a remote location.

The computer 1001 has an identical construction to that of the computer 1000.

Figure 2:
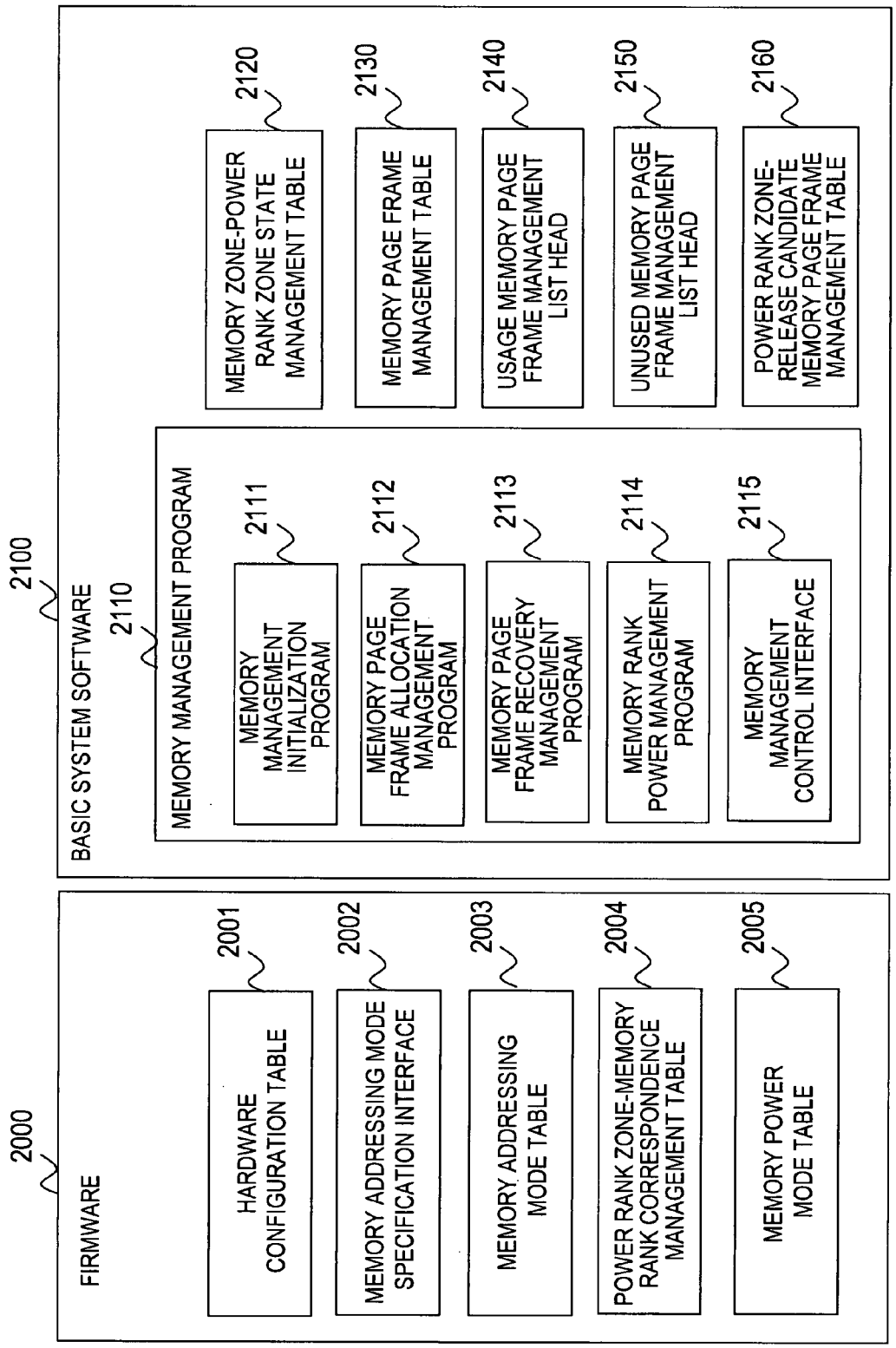
FIG. 2 is a schematic diagram of the firmware and basic system software according to the first embodiment of the invention.

FIG. 2 is a schematic diagram of the firmware and basic system software according to the first embodiment of the invention.

The firmware 2000 relates to the memory management system which reduces the power consumed by the memories 1030 to 1060 on the computer 1000 to 1001. The firmware 2000 is stored in the system ROM 1100.

The CPUs 1010 to 1011 load the firmware 2000 to the memories 1030 to 1060 from the system ROM 1100, and execute the firmware 2000. Specifically, the firmware 2000 provides basic control and basic information about the hardware with which the computers 1000 to 1001 are provided. For example, the firmware 2000 is a hypervisor.

The firmware 2000 includes a hardware configuration table 2001, a memory addressing mode specification interface 2002, a memory addressing mode table 2003, power rank zone-memory correspondence management table 2004 and memory power mode table 2005.

Information about the hardware with which the computer 1000 is provided, and information about the composition of the hardware, are registered in the hardware configuration table 2001.

The memory addressing mode specification interface 2002 is a program which functions as an interface to specify the memory addressing mode of the memories 1030 to 1060 from an input device.

A mode which allocates an address to the memories 1030 to 1060 is registered in the memory addressing mode table 2003.

In the power rank zone-memory correspondence management table 2004, power rank zones showing continuous memory addresses by which the basic system software 2100 can control the power mode via the memory controller 1020, and the memory ranks 1031 to 1062 corresponding to the power rank zones, are registered.

In the memory power mode table 2005, plural power modes of the memories 1030 to 1060 with which the computer 1000 to 1001 is provided, the power consumption in each mode, and the delay time (latency) produced when the memories 1030 to 1060 are accessed from the CPU 1010 to 1011 and the power mode is changed over, are registered.

The basic system software 2100 is stored in the secondary storage 1180 or secondary storage 1181 connected to the computer 1000, is loaded to the memories 1030 to 1060 from the secondary storage 1180 or secondary storage 1181, and is executed by the CPUs 1010 to 1011.

Specifically, the basic system software 2100 is software which manages the physical resources (e.g., the memories 1030 to 1060) of the computers 1000 to 1001, and provides an interface to a user, for example, an operating system. The basic system software 2100 may be stored in plural secondary storages 1180 and secondary storages 1181 in preparation for the case where a fault occurs in the secondary storage 1180.

A computer 1220 in a remote location connected to the network 1210 may distribute the basic system software 2100 via the network interface 1120. Various application software runs on the basic system software 2100 and services are provided.

Allocation requests for allocation the resources of the memories 1030 to 1060 to the software (application software, firmware 2000 and basic system software 2100) or release of the resources of the memories 1030 to 1060 from the software and generation of processes and completion of processes, are executed while the computer systems 1000 to 1001 are running.

The type and number of the application software which runs on the basic system software 2100 is arbitrary. The basic system software 2100 includes a memory management program 2110, memory zone-power rank zone state management table 2120, memory page frame management table 2130, used memory page frame management list head 2140, unused memory page frame management list head 2150, and power rank zone release candidate memory page frame management table 2160.

Further, the memory management program 2110 includes a memory management initialization program 2111, memory page frame allocation management program 2112, memory page frame recovery management program 2113, memory rank power management program 2114, and memory management control interface 2115.

The memory management program 2110 controls and manages the memory 1030 to 1060 resources with which the computers 1000 to 1001 are provided, and provides an interface relevant to the memory 1030 to 1060 resources to the user.

The memory management initialization program 2111 makes preparations which execute initialization of data required for control and management of the memory 1030 to 1060 resources, and provides an interface relevant to the memory 1030 to 1060 resources to the user.

The memory page frame allocation management program 2112 allocates suitable memory page frames (one unit in which the basic system software 2100 manages the memories 1030 to 1060) in corresponding to an allocation request for the memory 1030 to 1060 resources to the software.

The memory page frame recovery management program 2113 changes over suitable used memory page frames into unused memory page frames in corresponding to a memory page frame allocation release request for the memory 1030 to 1060 resources.

The memory rank power management program 2114 controls the power mode of the memory ranks 1031 to 1062. The memory management control interface 2115 is a program which functions as an interface to make it possible to change the setting of each parameter for managing the memories 1030 to 1060.

In the memory zone power-rank zone state management table 2120, a memory zone for each continuous memory address, the power rank zones contained within the continuous memory address, the power which each power rank zones consumes, and the usage state wherein each power rank zone uses the memory, are registered.

Information about memory page frames is registered in the memory page frame management table 2130.

The used memory page frame management list head 2140 is a variable showing the head of the used memory page frame management list 8000 which is a LRU (Least Recently Used) list including memory page frames of the memory page frame management table 2130, which are used memory page frames currently used by each software.

The unused memory page frame management list head 2150 is a variable showing the head of the unused memory page frame management list 8100 including memory page frames of the memory page frame management table 2130, which are unused memory page frames not used by each software.

In the power rank zone-release candidate memory page frame management table 2160, the power rank zone, the number of memory page frames which are candidates for releasing the allocation to the software in the power rank zones, and the number of remaining memory page frames currently used by each software when the release candidate memory page frames are released, are registered.

Moreover, the memory management program 2110 controls the power of the memories 1030 to 1060 in power rank zone units which group together single or plural memory ranks 1031 to 1062, which are the minimum units wherein the power which the memories 1030 to 1060 consume can be independently controlled.

Figure 3:
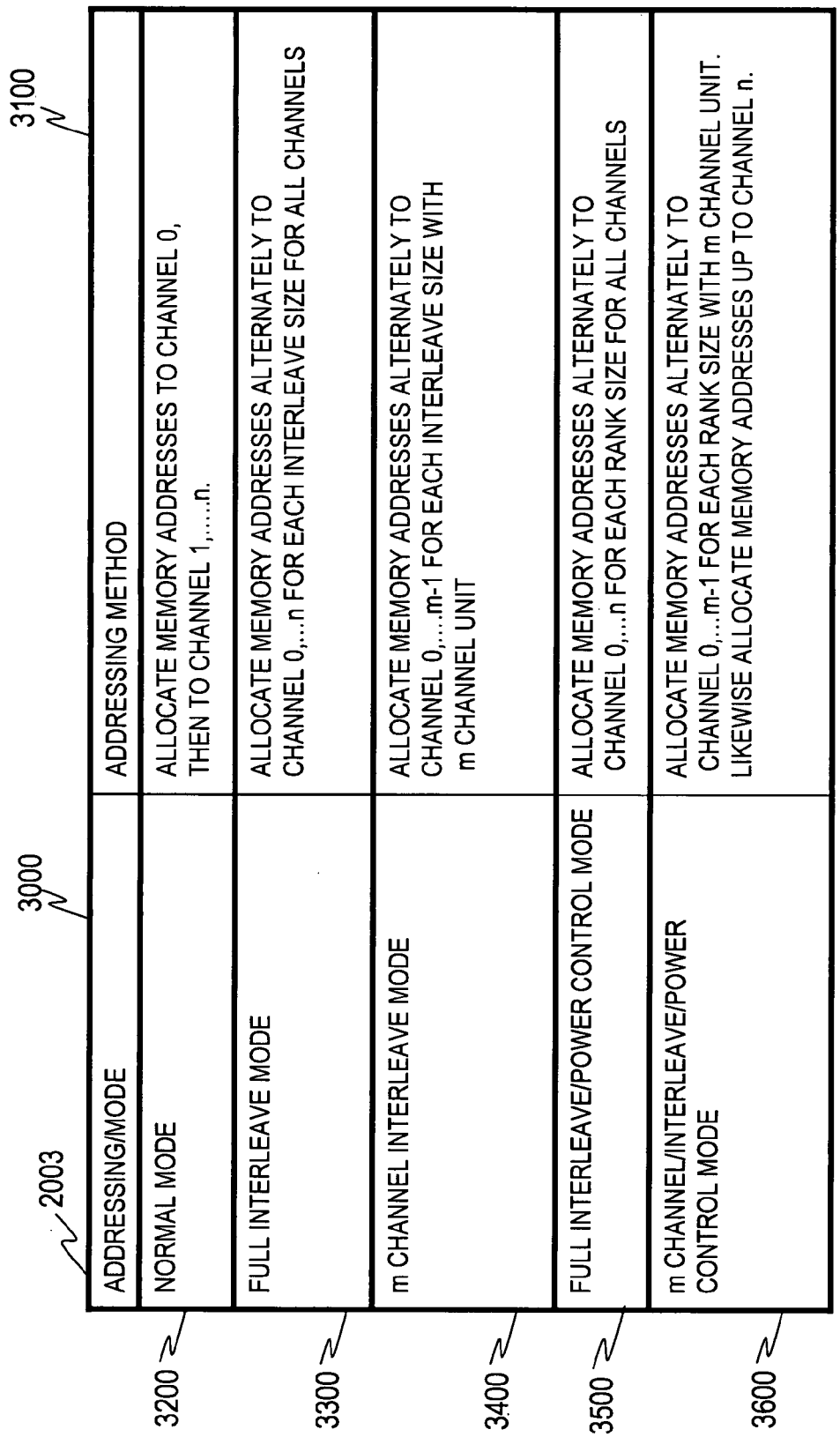
FIG. 3 is a schematic diagram of a memory addressing mode table according to the first embodiment of the invention.

FIG. 3 is a schematic diagram of the memory addressing mode table 2003 according to the first embodiment of the invention.

The memory addressing mode table 2003 is managed by the firmware 2000.

The memory addressing mode table 2003 includes an addressing mode 3000 and an addressing method 3100.

A unique identifier whereby a memory address is allocated to the memories 1030 to 1060 is registered in the addressing mode 3000. The user determines the method by which a memory address is allocated to the memories 1030 to 1060 based on the identifier registered in the addressing mode 3000. The method whereby a memory address is allocated to the memories 1030 to 1060, is registered in an addressing method 3100. Here, the memory address is a unique identifier showing the location where the CPUs 1010 to 1030 access the memory 1030 to 1060.

Next, the method whereby the memory address registered in the addressing method 3100 is allocated will be described.

In a normal mode 3200, the memory controllers 1020 to 1021 allocate a memory address from the memory 1040 connected to the memory controller 1020 via the channel 0 (1070). The memory controllers 1020 to 1021 then allocate a memory address to the memory 1040 connected to the memory controller 1020 via the channel 0 (1070). Next, the memory controllers 1020 to 1021 allocate memory addresses sequentially from the memory 1050 connected to the channel 1 to the memory 1060 connected to the channel n (1080).

In a full interleave mode 3300, the memory controllers 1020 to 1021 allocate a memory address alternately between the memories (1030 to 1040) connected to the memory controller 1020 via the channel 0 (1070), and the memories (1050 to 1060) connected to the memory controller 1020 via the channel n (1080), to all the channels 0 to n (1070 to 1080) for each predetermined interleave size.

"Alternately" means that if, for example, a memory address of a certain number is allocated to the memory 1030, the memory address of the following number is allocated to the memory 1040. This is identical in the following power control modes.

In an m channel interleave mode 3400, the memory controllers 1020 to 1021, taking m channels as one unit, allocate a memory address for each predetermined interleave size alternately between the memories (1030 to 1040) connected to the memory controller 1020 via the channel 0 (1070), and the memory connected to the memory controller 1020 via a channel m-1, and this is repeated up to the memory 1060 connected to the memory controller 1020 via the channel n (1080).

In a full interleave/power control mode 3500, the memory controller s 1020 to 1021 allocate a memory address for each size of the memory rank 1031 alternately between the memories (1030 to 1040) connected to the memory controller 1020 via the channel n (1070), and the memories (1050 to 1060) connected via the channel n (1080), to all the channels 0 to n (1070 to 1080).

In a m channel interleave/power control mode 3600, the memory controllers 1020 to 1021, taking m channels as one unit, allocate a memory address for each predetermined interleave size alternately between the memories (1030 to 1040) connected to the memory controller 1020 via the channel 0 (1070), and the memory 1030 connected to the memory controller via the channel m-1, and this is repeated up to the channel n (1080).

Here, interleave means that when a memory address is allocated alternately to the memories 1030 to 1060 connected to the channels 1070 to 1080, memory addresses are allocated continuously spanning plural channels 1070 to 1080. Hence, the CPUs 1010 to 1011 can accelerate access to the continuous memory addresses.

Interleave size means the capacity of the memory address allocated to one of the channels 1070 to 1080. The memory controllers 1020 to 1021 allocate memory addresses so that interleave is executed for each interleave size.

Frequently, the interleave size is the cache line size of the CPUs 1010 to 1011. The interleave size which is the cache line size is smaller than the size of a memory page frame. For this reason, since the memory address is allocated so that plural of the channels 1070 to 1080 can be spanned, one memory page frame covers plural memory addresses. Therefore, since one memory page frame spans plural memory ranks 1031 to 1062, power control of the memories 1030 to 1060 is not efficient.

Hence, the full interleave mode 3300 and the m channel interleave mode 3400 to which a memory address is allocated for each interleave size are not suitable for memory power reduction.

The interleave size of the full interleave power control mode 3500, and m channel interleave power control mode 3600, are set to values equal to the size of the memory rank 1031. Since the rank size of the memory rank 1031 is larger than the size of a memory page frame, one or plural memory page frames are included in one of the memory ranks 1031, so efficient memory power control can be executed.

Also, in the normal mode 3200, memory addresses are allocated sequentially from the memory rank 1031, i.e., a memory address is allocated for each memory rank 1031, so efficient memory power control can be executed.

The addressing mode 3000 of the memory addressing mode table 2003 is usually set beforehand as the normal mode 3200 by the firmware 2000.

Also, the user can select the addressing mode 3000. Specifically, when the computers 1000 to 1001 is started and the firmware 2000 is executed, the addressing mode 3000 can be selected via the memory addressing mode specification interface 2002 using an input device such as the keyboard 1190 of the computers 1000 to 1001.

The user can also change the information (interleave size, number of interleave channels) set in the memory addressing mode table 2003.

The user may also select the addressing mode 3000 via the memory addressing mode specification interface 2002 using the computer 1220 connected to the computer 1000 to 1001 via the network 1210.

Alternatively, the user may modify the information registered in the memory addressing mode table 2003 via the memory addressing mode specification interface 2002, using the network 1220 connected to the computer 1000 to 1001 via the network 1210.

Figure 4:
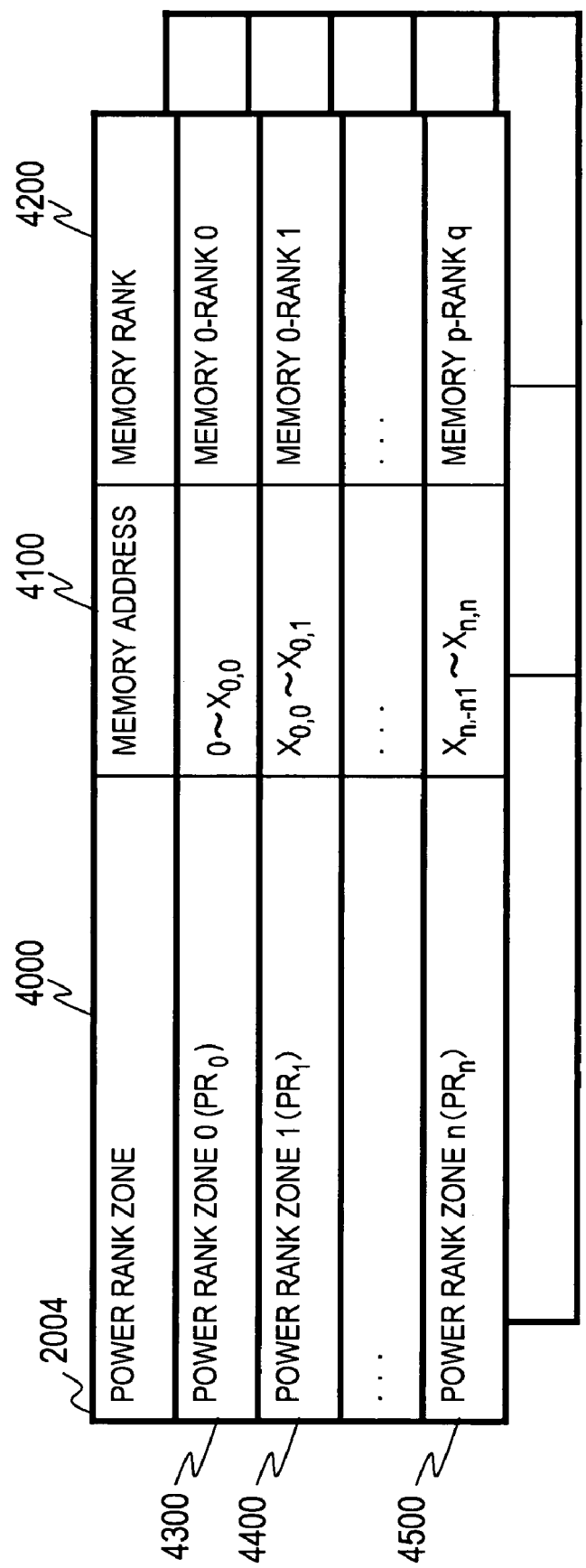
FIG. 4 is a schematic diagram of a power rank-memory rank correspondence management table according to the first embodiment of the invention.

FIG. 4 is a drawing showing the structure of a power rank zone-memory rank correspondence management table 2004 according to the first embodiment of the invention.

The power rank zone-memory rank correspondence management table 2004 is managed by the firmware 2000.

The power rank zone-memory rank correspondence management table 2004 includes a power rank zone 4000, memory address 4100, and memory rank 4200.

The memory rank zone 4000 is configured so that the number of memory ranks 1031 to 1062 forming the continuous memory address area is a minimum, and is a unit whereby the power can be controlled.

The memory address 4100 is the memory address of a continuous memory address range including the power rank zone 4000. The memory rank 4200 shows the memory ranks 1031 to 1062 including the power rank zone 4000.

For example, the power rank zone 0 ($PR_0$) 4300 is constituted by the range of continuous memory addresses 0 to $X_{0,0}$ and the rank 0 (1031) of the memory (1030).

When the basic system software 2100 is executed, the power rank-memory rank correspondence management table 2004 is loaded, for example to the memories 1030 to 1060 so that the basic system software 2100 can refer the power rank zone-memory rank correspondence management table 2004.

The information registered in the power rank zone-memory rank correspondence management table 2004 is set beforehand by the firmware 2000 based on the memory addressing mode table 2003.

The firmware 2000 detects the minimum memory rank 1031 that constitutes the changed continuous memory address area.

In case of which the information registered in the memory addressing mode table 2003 is changed by the user, the memory addresses allocated to the memories 1030 to 1060 is changed. The firmware 2000, according to this change, calculates the minimum memory rank forming the continuous memory address area, and modifies the power rank-memory rank correspondence management table 2004.

When the power rank zone-memory rank correspondence management table 2004 is modified, and data for the channels 1070 to 1080, memories 1030 to 1060 and memory ranks 1031 to 1062 are required, the firmware 2000 refers up the hardware configuration table 2001 in which these data are registered.

The basic system software 2100 may also generate, add to and modify the power rank zone-memory rank correspondence management table 2004 by referring the memory addressing mode table 2003 and the hardware configuration table 2001. Also, the power rank zone-memory rank correspondence management table 2004 may be generated for each addressing mode (3200 to 3600) corresponding to each addressing mode (3200 to 3600) of the memory addressing mode table 2003.

FIG. 5 is a schematic diagram of the memory power mode table 2005 according to the first embodiment of the invention.

The memory power mode table 2005 is managed by the firmware 2000. The memory power mode table 2005 includes a power mode 5000, power consumption 5100, and mode change-over latency 5200.

The power modes of the memory ranks 1031 to 1060 included by the memories 1030 to 1060 can be changed over, are registered in the power mode 5000.

The value of the power consumed by the memory ranks 1031 to 1060 in each power mode of the memory ranks 1031 to 1062 is registered in the power consumption 5100. The value of the delay time (latency) of the delay generated when the memory ranks 1031 to 1062 change over from one power mode to another power mode, is registered in the mode change-over latency 5200.

For example, three power modes (5300 to 5500) are registered in the memory power mode table 2005 shown in FIG. 5. In the power mode 0 (Standby) 5300, the power consumed by the memory rank 1031 per hour is $X_0$. Also, since it is the present power mode when the memory ranks of power mode 0 (Standby) 5300 change over to the power mode 0, latency is not generated. The latency generated when the memory rank 1031 in the power mode 0 (Standby) 5300 changes to the power mode 1 is $Y_{0,1}$, and the latency generated when changing to the power mode 2 is $Y_{0,2}$.

The CPUs 1010 to 1011 can access the memory ranks 1031 to 1062 of power mode 0 (Standby) 5300. Moreover the CPUs 1010 to 1011 cannot access the memory ranks 1031 to 1062 in power mode 1 (Power Down) 5400 and power mode 2 (Self-refresh) 5500, without generating a delay.

Hence, when the CPUs 1010 to 1011 read from/write to the memory ranks 1031 to 1062, access is executes after the power mode 5000 of the memory ranks 1031 is putted into the state of power mode 0 (Standby) 5300.

As for the power consumption 5100 consumed by the memory ranks 1031 to 1062, $X_2$ of power mode 2 (Self-refresh) 5500 is the lowest, next, $X_1$ of power mode 1 (Power Down) is low, and $X_0$ of power mode 0 (Standby) 5300 is the highest.

Power mode 0 (Standby) 5300 is the active state, whereas power mode 1 (Power Down) 5400 and power mode 2 (Self-refresh) 5500 are the inactive state.

The information in the memory power mode table 2005 is set beforehand by the firmware 2000 based on the memories 1030 to 1060 of the computers 1000 to 1001.

FIG. 6 is a schematic diagram of the memory zone-power rank zone state management table 2120 according to the first embodiment of the invention.

An identifier of the memory zone managed by the basic system software 2120 corresponding to the range of memory addresses is registered in the memory zone 6000.

The memory zone-power rank zone state management table 2120 is managed by the basic software 2100.

The memory zone-power rank zone state management table 2120 includes a memory zone 6000, address range 6010, power rank zone 6020, power rank zone size 6030, power state 6040, number of memory page frames 6050, first degree time differential 6060 of the number of used memory page frames, and second degree time differential 6070 of the number of used memory page frames.

A memory zone 6000 shows the area wherein the basic system software 2100 manages corresponding to the memory address. The memory address included in each memory zone 6000 is registered in the address range 6010. The power rank zone included in the address range 6010 is registered in the power rank zone 6020.

The capacity of each of the power rank zones 6020 is registered in the power rank zone size 6030. The power state of the memory ranks 1031 to 1062 including each of the power rank zones 6020 is registered in the power state 6040. The number of unused memory page frames which are not used by each software among the memory page frames of the memory ranks 1031 to 1062 including each of the power rank zones 6020, is registered in the number of memory page frames 6050. The first degree time differential of the number of used memory page frames currently used by each software among the memory page frames of the memory ranks 1031 to 1062 including the power rank zone 6020, is registered in the first degree time differential 6060 of the number of used memory page frames. In other words, the first degree time differential of used memory page frames shows the speed with which memory page frames are used. A second time differential of the used memory page frames of the memory ranks 1031 to 1062 belonging to the power rank zone 6020, is registered in a used memory page number second time differential 6070. In other words, the second time differential of used memory page frames shows the acceleration with which memory page frames are used.

For example, the memory zone-power rank zone state management table 2120 shown in FIG. 6, manages the memory zones (6080, 6090, 6100) and power rank zones (6081 to 6082, 6091 to 6092, 6101 to 6102) in each memory zone.

The memory zone Zone 0 (6080) includes the memory addresses of the address range 0 to $X_0$, and the Zone 0 (6080) includes the power rank zones $PR_0$ to $PRX_0$ (6081 to 6082).

The power rank zone $PR_0$ (6081) has a capacity of $RS_0$, the power mode of the power rank zone $PR_0$ is $PS_0$, the number of memory page frames which are not used by each software in the power rank zone $PR_0$ (6081) is $Su_0$, the first time differential value of the number of memory page frames used by each software is $Su'_0$, and the second time differential value of the number of memory page frames used by each software is $Su''_0$.

The power rank zone 4000 which is the memory address 4100 within the range of the memory addresses of the address range 6010 of the memory zone 6000, is registered in the power rank zone 6020.

Figure 7:
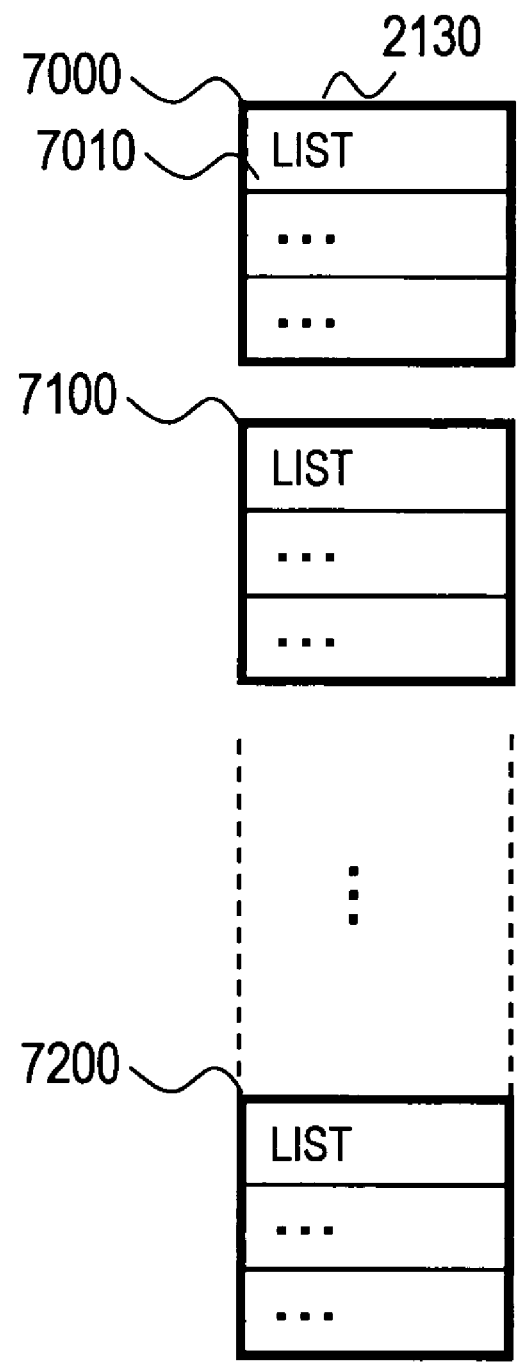
FIG. 7 is a schematic diagram of a memory page frame management table according to the first embodiment of the invention.

The information registered in the memory zone-power rank zone state management table 2120 is set by the memory management initialization program 2111 when the computing computer 1000 to 1001 is started, and it is updated by the memory management program 2110 while the computers 1000 to 1001 are running, FIG. 7 is a schematic diagram of the memory page frame management table 2130 according to the first embodiment of the invention.

The memory page frame management table 2130 is managed by the basic system software 2100. The memory page frame management table 2130 is a table which manages the memory page frames (7000 to 7200).

The memory page frame management table 2130 includes at least the list data variable 7010 for connecting the used memory page management list head 2140 and the unused memory page management list head 2150 to the head list structure. The number of memory page frames (7000 to 7200) obtained by dividing the total capacity of the memories 1030 to 1060 of the computers. 1000 to 1001 by the capacity of one memory page frame, is included in the memory page frame management table 2130.

The basic system software 2100 executes allocation of the memory 1030 to 1060 resources in memory page frame units to software via the memory controller 1020.

The used memory page frames mean memory page frames which are allocated to each software and used for each software. On the other hand, the unused memory page frames means the memory page frames which are not used by any software.

The memory page frame management table 2130 is set by the memory management initialization program 2111 when the computers 1000 to 1001 are started. The memory page frame management table 2130 is updated by the memory management program 2110 while the computers 1000 to 1001 are running.

Figure 8:
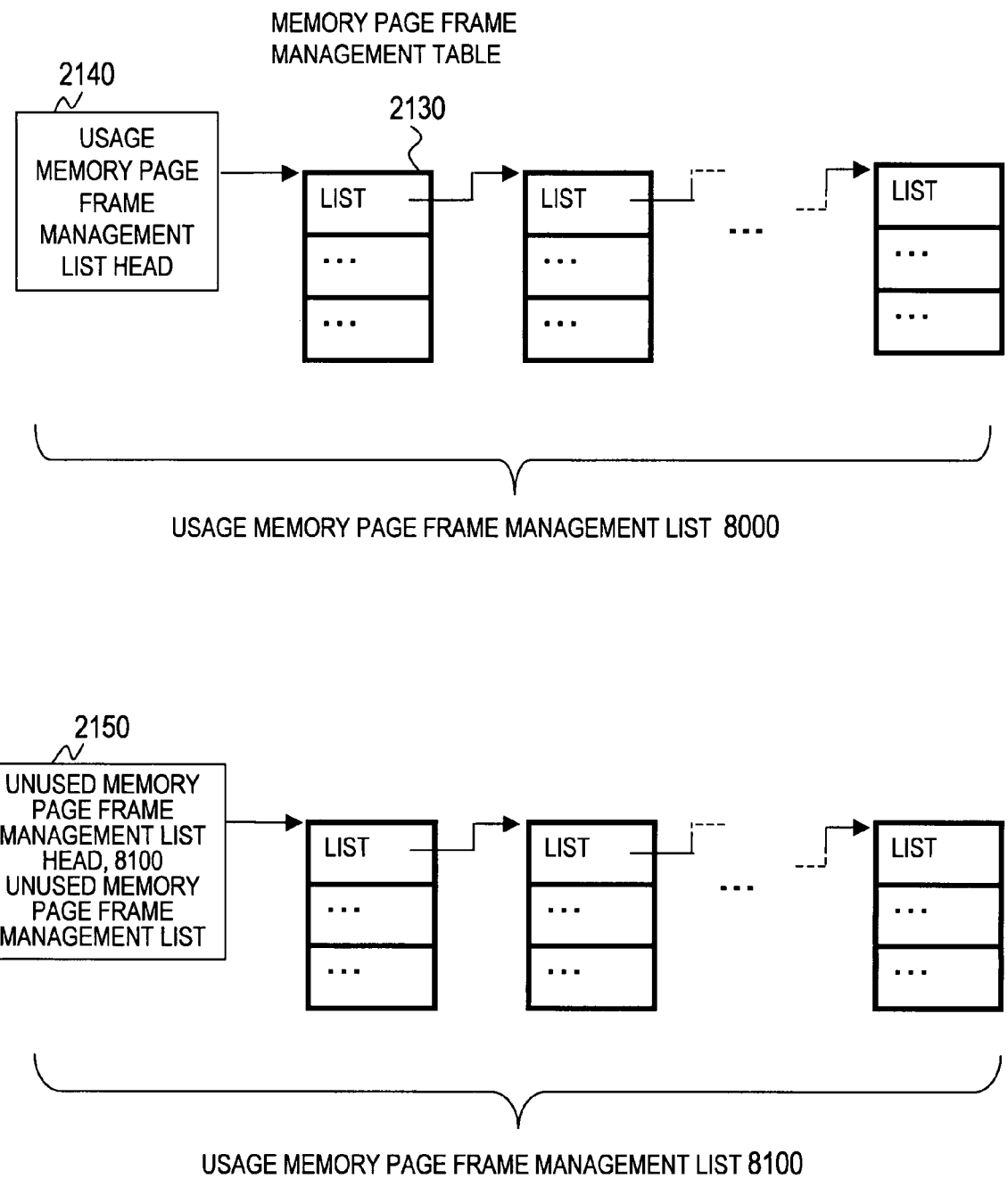
FIG. 8 is a schematic view of a used memory page frame management list, used memory page frame management list head, unused memory page frame management list, and a memory page frame management list head according to the first embodiment of the invention.

FIG. 8 is a schematic diagram of the used memory page frame management list 8000, the used memory page frame management list head 2140, the unused memory page frame management list 8100, and the unused memory page frame management list head 2150 according to the first embodiment of the invention.

The used memory page frame management list 8000 is a LRU (Least Recently Used) list. The used memory page frame management list 8000 is constructed by connecting the list data variable 7010 of memory page frames in the order used starting from the head. In other words, the list data variable 7010 of memory page frames is associated with the used order.

The leading memory page frames are memory page frames which were used recently. The used memory page frame management list head 2140 is managed by the basic system software 2100. The used memory page frame management list head 2140 is a head list variable which shows the head of the LRU list 8000.

The basic system software 2100 allocates suitable memory page frames with reference to the unused memory page frame management list 8100 in response to a request for allocation of the memories 1030 to 1060 to each software from the CPUs 1010 to 1011.

The basic system software 2100 then connects the memory page frame management tables 7000 to 7200 of the allocated memory page frames to the head of the used memory page frame management list 8000.

The basic system software 2100 also selects suitable memory page frames from the used memory page frame management list 8000 and releases the selected memory page frames in response to a request to release allocation of memories 1030 to 1060 to each software from the CPUs 1010 to 1011.

The unused memory page frame list 8100 manages unused memory page frames by connecting unused memory page frames. The unused memory page frame management list head 2150 is managed by the basic system software 2100. The unused memory page frame management list head 2150 is a head list variable of the unused memory page frame list 8100.

The basic system software 2100 usually releases the memory page frames at the end of the used memory page frame management list 8000 in response to a request to release allocation of memories 1030 to 1060 to each software from the CPUs 1010 to 1011. The basic system software 2100 connects the memory page frame management tables 7000 to 7200 of the released memory page frames to the unused memory page frame management list 8100.

The basic system software 2100 selects suitable memory page frames from the unused memory page frame management list 8100, and allocates memory pages in response to a request for allocation of the memories 1030 to 1060.

The used memory page frame management list 8000 and the unused memory page frame management list 8100 are set by the memory management initialization program 2111 when the computers 1000 to 1001 are started. It is also updated by the memory management program 2120 while the computers 1000 to 1001 are running.

In this embodiment, the case was described where the used memory page frame management list 8000. and the unused memory page frame management list 8100 were single lists, but there may also be plural used memory page frame management lists 8000 and unused memory page frame management lists 8100. By having plural lists, finer management can be executed.

FIG. 9 is a schematic diagram of the power rank zone release candidate page table 2160 according to one embodiment of the invention.

The power rank zone release candidate page table 2160 is managed by the basic system software 2100. The power rank zone release candidate page table 2160 includes the power rank zone 9000, the number of release candidate memory pages 9100, and the number of remaining memory page frames 9200.

The power rank zone 9000 shows the power rank zones. The number of memory page frames which constitute release candidates among the memory page frames including in the power rank zones, is registered in the number of release candidate memory pages 9100. The difference between the number of release candidate memory pages 9100 and the number of unused memory page frames which are not used by each software among the number of memory page frames including the power rank zones, is registered in the number of remaining memory page frames 9200. In other words, when a release candidate target memory page frame is released for each power rank zone, the number of memory page frames currently used by each software is registered in the number of remaining memory page frames 9200.

For example, the power rank zone release candidate page table 2160 shown in FIG. 9 manages plural power rank zones (9300 to 9500). The number of release candidate page frames of the power rank zone $PR_i$ (9300) is $P_j$, and the number of remaining page frames is $D_k(S)$.

The content of the power rank zone release candidate page table 2160 is created and updated by the memory page recovery control program 2113.

Figure 10:
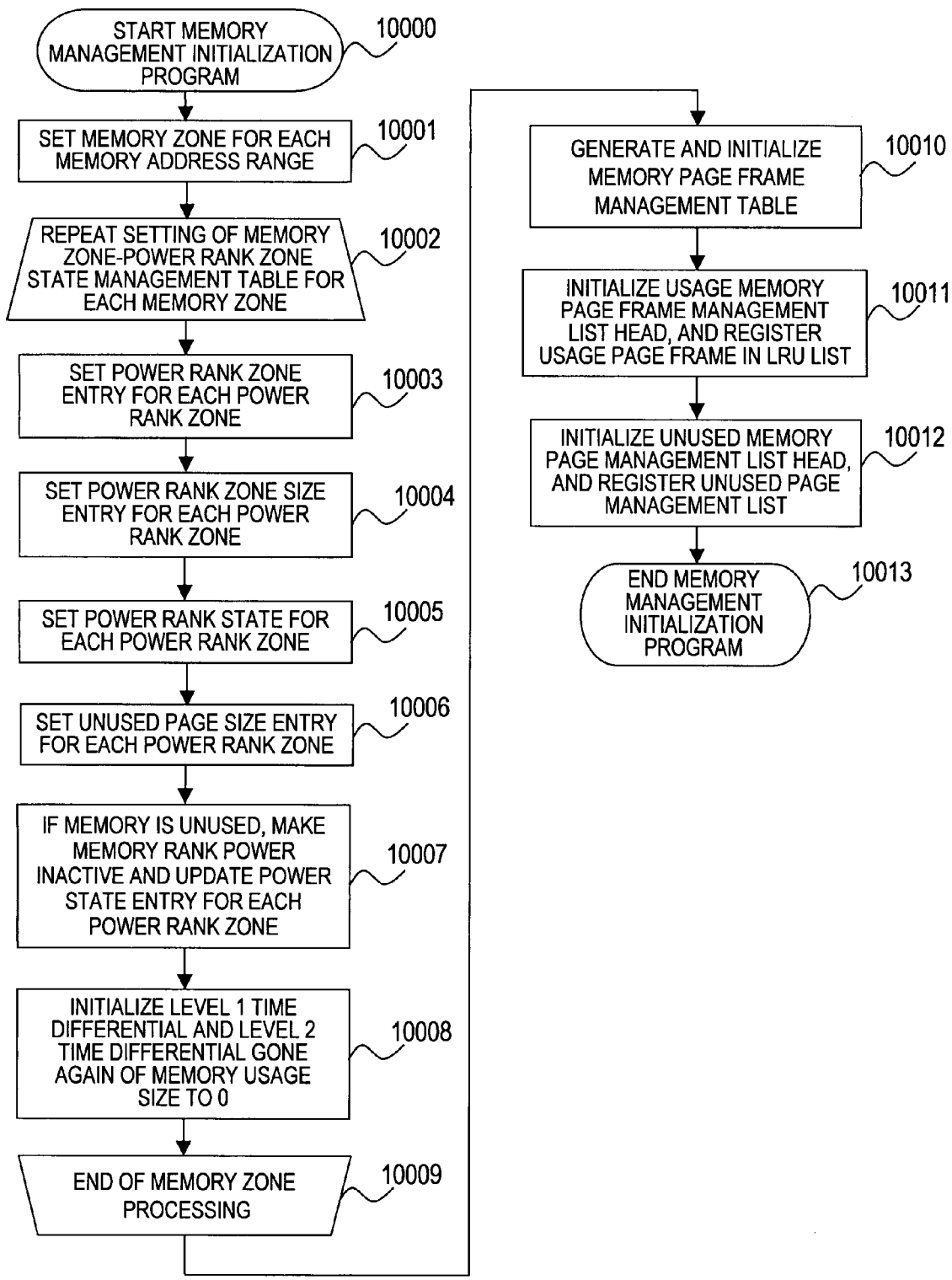
FIG. 10 is a flow chart of a memory management initialization program according to the first embodiment of the invention.

FIG. 10 is a flow chart of the memory management initialization program 2111 according to the first embodiment of the invention.

The memory management initialization program 2111 is a program which executes initialization of the various tables of the basic system software 2100.

First, when the computers 1000 to 1001 start, the memory management initialization program 2111 is executed by the CPUs 1010 to 1011 (10000).

The memory management initialization program 2111 sets a memory zone 6000 for every memory address range 6010 in the memory zone-power rank zone state management table 2120 (10001). For example, the memory zone 6000 may be classified into three memory zones, DMA (Direct Memory Access) (16 MB), Normal (4 GB), and High (4 GB or more). In the memory zone-power rank zone state management table 2120 shown in FIG. 6, Zone 0 corresponds to Direct Memory Access, Zone 1 corresponds to Normal, and Zone 2 corresponds to High.

The construction of the memory zone 6000 when the computers 1000 to 1001 form a Numa system, may be a memory zone divided among each of the computers 1000 to 1001. When data of the structure of the memory 1030 and data of the structure of other hardware are required for the memory management initialization program 2121, for example, the memory management initialization program 2111 refers the power rank zone-memory rank correspondence management table 2114 in the firmware 2000.

Next, the memory management initialization program 2111, for the memory zones 6080 to 6100 set by the processing of the step 10001, repeats the processing (10003 to step 10008) which initializes the memory zone-power rank zone state management table 2120 (10002).

The memory management initialization program 2111 and sets the power rank zone 4000 included in the address range 6010 of the memory zone 6000 which is set in the step 10001, in the power rank zone 6020 of the memory zone power rank zone management table 2120, referring the power rank zone-memory correspondence management table 2004.(10003).

In case of which the power rank zone $PR_{xo}$, for example, spans the memory zone 0 and memory zone 1, i.e., in case of which the memory address area of the power rank zone $PR_{xo}$ is included in the both the area of the memory address of Zone 0 and the memory address of Zone 1, the memory management initialization program 2111 registers the identifier (6082, 6091) of the power rank zone $PR_{xo}$ in the power rank zone 6020 of the spanned, plural memory zones (Zone 0 and Zone 1).

Also, as in the step 10003, the memory management initialization program 2111 also refers the power rank zone-memory rank correspondence management table 2004, and registers the value of the capacity of the power rank zone 4000 in the address range 6010 of the memory zone 6000, in a power rank size 6030 of the memory zone-power rank zone management table 2120 (10004).

For example, if the power rank zone $PR_{xo}$ spans Zone 0 and Zone 1, the memory management initialization program 2111 registers the size $RS_{x0-0}$ (6082) of the power rank zone $PR_{xo}$ of the memory address area included in the memory address area of Zone 0, in the power rank zone size 6030 of Zone 0.

The memory management initialization program 2111 registers the size $RS_{x0-1}$ (6091) of the power rank zone $PR_{x0}$ of the memory address region of the power rank zone $PR_{x0}$ contained in the memory address region of Zone 1, in the power zone rank size 6030 of Zone 1. In other words, when a power rank zone spans plural memory zones, the memory management initialization program 2111 registers a size part for which the power rank zone size belongs in the memory zone.

Next, the memory management initialization program 2111 registers the power state 6040 of each power mode state for each power rank zone (6081 to 6082, 6091 to 6092, 6101 to 6102) (10005). For example, the memory management initialization program 2111 registers the state of the power mode of the memory ranks 1031 to 1062 by directly referring the memory 1031 to the memory rank 1062 via the memory controllers 1020 to 1021. Also, the memory management initialization program 2111 may register the state of the power mode of the memory ranks 1031 to 1062 by referring the hardware configuration table 2001.

After the step 10005, the memory management initialization program 2111 registers the number of the memory page frames not used by each software in the unused number of memory page frames 6050 for each of the power rank zones (6081 to 6082, 6091 to 6092, 6101 to 6102) (10006). In case of which memory management is initialized, the number of unused memory page frames of each power rank zone is computed by calculating the difference between, for example, the number of memory page frames included in the power rank zone size 6030 of each power rank zone 6020, and the number of memory page frames of each power rank zones 6020 used to initialize the basic system software 2100 and used codes and data.

After the processing of the step 10006, the memory management initialization program 2111 changes over the power mode state of all the memory ranks 1031 to 1062 for which all the memory page frames included in the power rank zone 6020 are not used by each software, to an inactive state, and updates the power state 6040 (10007). The change of the power state of the memory ranks 1031 to 1062 is executed for example via the memory controllers 1020 to 1021.

After the step 10007, the memory management initialization program 2111 initializes the first time differential value 6060 and the second time differential value 6070 of the number of memory page frames used by each software for each power rank zone (6081 to 6082, 6091 to 6092, 6101 to 6102) to 0 (10008).

After the step 10008, the memory management initialization program 2111 repeats the step 10003 to step 10008 for each of the memory zones 6080 to 6100 (10009), and when the step 10003 to step 10008 are completed for all the memory zones 6000, the memory page frame management table 2130 is generated and initialized (10010).

After the step 10010, the memory management initialization program 2111 initializes the used memory page frame management list head 2140, and registers the used memory page frames in the memory page frame management list 8000 (10011). Among the used memory page frames currently used by the firmware 2000 and basic system software 2100, it is not necessary to register the memory page frames which are not released from allocation of the memories 1030 to 1060 resources and recovered in the memory page frame management list 8000.

Also, the memory management initialization program 2111 initializes the unused memory page management list head 2150, and generates the unused memory page frame management list 8100 (10012).

The memory management initialization program 2111 is completed after the step 10012 (10013).

Figure 11:
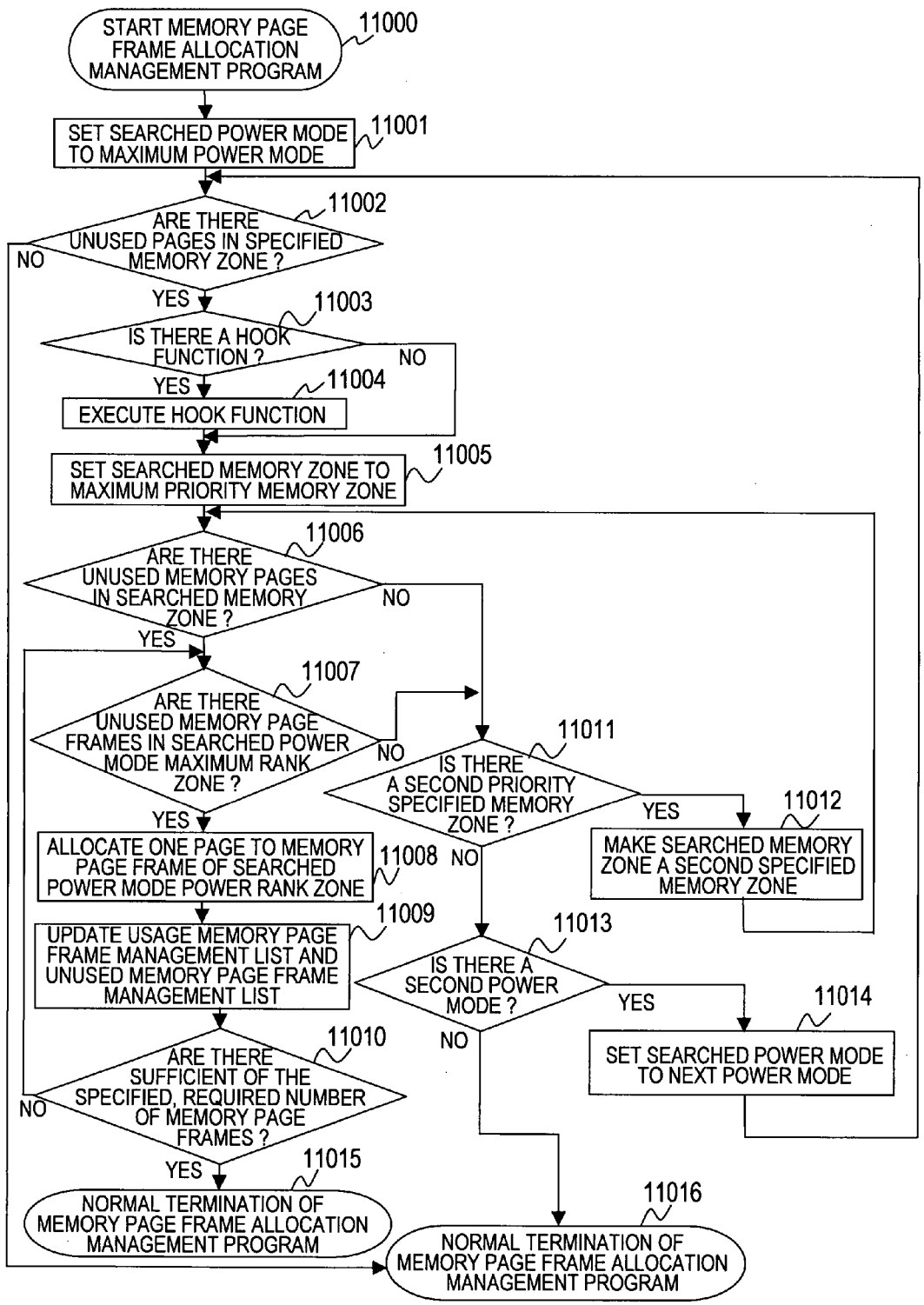
FIG. 11 is a flow chart of a memory page frame allocation management program according to the first embodiment of the invention.

FIG. 11 is a flow chart of the memory page frame allocation management program 2112 according to the first embodiment of the invention.

For example, the memory management program 2110 specifies the memory zone 6000 to which page frames are to be allocated and the number of memory page frames, and the memory page frame allocation management program 2112 is executed (11000). The specified memory zones 6080 to 6100 may be singular or plural.

If an allocation priority is specified, when specifying plural memory zones, this will be taken as the priority order of the memory zones 6080 to 6100.

First, the memory page frame allocation management program 2112 sets a target power mode (search power mode) for searching the memory page frames to be allocated, as a maximum power mode ($PS_0$ power-mode 0 (Standby) 5300) (11001). The memory page frame allocation program 2112 searches the memory page frames of the power rank zones for which the power state 6040 of the memory zone-power rank zone state management table 2120 is the active state.

Next, it is determined whether or not the memory page frame allocation management program 2112 has memory page frames which are not used by each software in the specified memory zones 6080 to 6100 (11002). Specifically, this is determined by referring the number of unused memory page frames 6050 of the memory zone-power rank zone state management table 2120.

When it is determined that the memory page frame allocation management program 2112 has unused memory page frames, the routine proceeds to the step 11003, and when it is determined that there are no unused memory page frames, the routine proceeds to a step 11016.

The memory allocation management program 2112 returns an error, and completes (11016).

First, in case of which the memory page frame allocation management program 2112 determined that there are unused memory page frames, it is determined whether or not a hook function is registered (11003). The programs registered in the hook function are arbitrary programs. In this embodiment, the memory rank power management program 2114 is registered in the hook function.

In case of which the hook function is registered, the hook function is executed (11004). In case of which the hook function is not registered, the routine proceeds to a step 11005.

After the step 11004, in case of which it is determined that the hook function is not registered (11003), the memory zone first specified by the memory management program 2110, (memory zone with the highest priority in the memory allocation) 6000, is set as the memory zone (search memory zone) for which memory page frames allocate to each software are to be searched (11005).

After the step 11005, the memory allocation management program 2112 determines whether or not there are memory page frames not used by each software in the search memory zone by referring the number of unused memory page frames 6050 (11006).

When there are unused memory page frames in a searched memory zone, the routine proceeds to a step 11007, and when there are no unused memory page frames in the searched memory zone, the routine proceeds to a step 11011.

When there are unused memory page frames in a searched memory zone, it is determined whether or not there are unused memory page frames in the power rank zones 6020 of a searched power mode (activity state) in a searched memory zone by referring the number of unused memory page frames 6050 (11007).

When it is determined that there are unused memory page frames in the power rank zones of a search power mode, the routine proceeds to a step 11008, and when it is determined that there are no unused memory page frames in the power rank zones of a search power mode, the routine proceeds to the step 11011.

When there are unused memory page frames in the power rank zones of a search power mode, the memory allocation management program 2112 takes one of the memory page frames including the search power rank zone 6020 of the search power mode as the memory page frame to be allocated by referring the unused memory page frame management list 8100 (11008).

After the step 11008, the memory allocation management program 2112 updates the memory page frame management list 8000 and the unused memory page frame management list 8100 for the target memory page frames 7000 to 7200 of the memory page frame management table 2130 (11009).

After the step 11009, the memory allocation management program 2112 determines whether or not the specified required number of memory page frames was allocated (11010).

When it is determined that the specified number of memory page frames was allocated, the memory page frame control program 2112 is completed (11015).

When the specified number of memory page frames is not allocated, the routine returns to the step 11007.

When it is determined that there are no unused memory page frames in the search memory zone in the step 11006, or when it is determined that there are no unused memory page frames in the power rank zones 6020 of the search power mode in the step 11007, the memory allocation management program 2112 determines whether or not there are memory zones 6080 to 6100 of the next priority degree in the specified memory zone (11011).

When there are memory zones 6080 to 6100 of the specified next priority, the memory allocation management program 2112 sets a search memory zone as the memory zone of the next priority (11012), and returns to the step 11006.

When it is determined that there are no memory zones of the specified next priority in the step 11011, it is determined whether or not there is a search power mode of the next priority (11013).

When it is determined that there is a search power mode of the next priority, the search power mode is set as the power mode of the next priority (11014), and the routine returns to the step 11002.

When it is determined that the search power mode of the next priority does not exist, the memory allocation management program 2112 returns an error and terminates abnormally (11016).

Figure 12A:
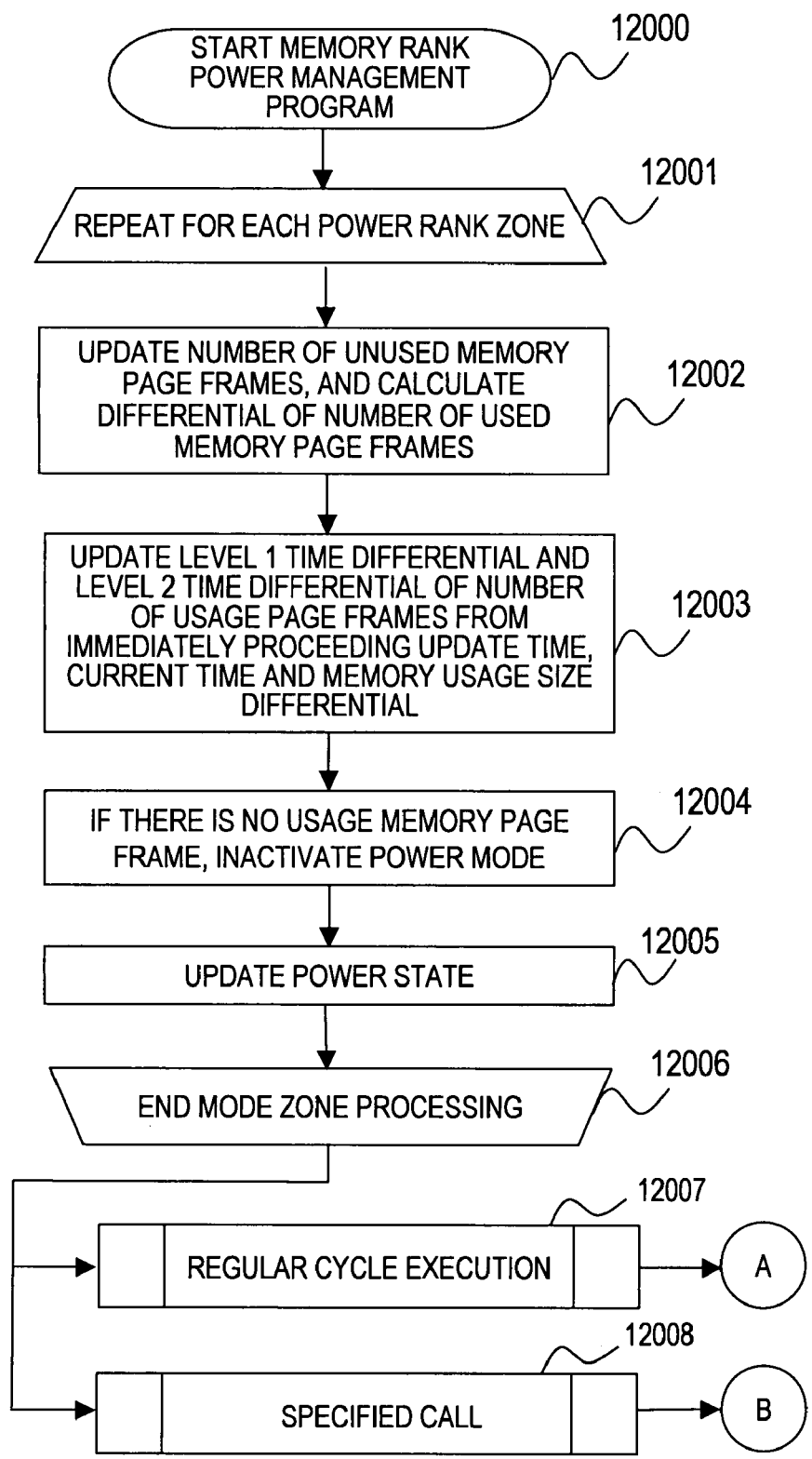
FIG. 12A is a flow chart of a memory rank power management program according to the first embodiment of the invention.

FIG. 12A is a flow chart of the memory rank power management program 2114 according to the first embodiment of the invention.

The memory rank power management program 2114 may be set by the memory management initialization program 2111 so that, for example, it is executed periodically. Although a default value is set for the periodic execution time, the manager can change the periodic execution time via the memory management control interface 2115 using an input device such as the keyboard 1190 of the computers 1000 to 1001.

The manager can also set a periodic execution time via the memory management control interface 2115 via a network 1500 from a computer 1600 in a remote location.

Moreover, the memory rank power management program 2114 need not be performed periodically, but may be called directly. When the memory rank power management program 2114 is called directly, the memory power supply management program 2114 is for example registered as a hook function of the memory page frame allocation management program 2112, and may be executed as a hook function (11004).

When the memory rank power management program 2114 is executed (12000), the memory rank power management program 2114 will first repeat the steps 12002 to 12005 described below for each power rank zone 6020 (12001).

First, the memory rank power management program 2114 updates the number of unused memory page frames 6050 of the memory zone-power rank zone state management table 2120, and calculates a difference value between the number of used memory page frames when the memory rank power management program 2114 was executed on the immediately preceding occasion, and the number of used memory page frames when the memory rank power management program 2114 was executed on the present occasion (12002). This difference value shows the number of memory page frames used by each software while the memory rank power management program 2114 is executed from when the memory rank power management program 2114 was executed on the immediately preceding occasion.

The number of memory page frames 6050 is updated by referring to the unused memory page frame management list 8100.

After the step 12002, the memory rank power management program 2114, from the difference value of the immediately preceding update time and the current time of the memory zone-power rank zone state management table 2120, and the difference value calculated in the step 12002, calculates the first differential and second differential with respect to time of the number of memory page frames used on the immediately preceding occasion the memory rank power management program 2114 was executed and while the memory rank power management program 2114 was executed on the current occasion, and updates the first time differential 6060 of the number of used memory page frames and the second time differential 6070 of the number of used memory page frames (12003).

When there are no memory page frames currently used by each software, the memory rank power management program 2114 changes over the power mode 5000 of the memory ranks 1031 to 1062 including the power rank zones (6081 to 6082, 6091 to 6092, 6101 to 6102) selected from the power rank zone memory correspondence management table 2120 to an inactive state (12004).

When the power mode 5000 of the memory ranks 1031 to 1062 is changed in the step 12004, the memory rank power management program 2114 updates the power state 6040 of the power rank zone 6020 of the memory zone-power rank zone state management table 2120 (12005). The memory rank power management program 2114 extracts information on the power mode of the memory ranks 1031 to 1062, for example with reference to the hardware configuration table 2001. Alternatively, the memory power supply management program 2114 may extracts information about the power mode of the direct memory ranks 1031 to 1062 via the memory controllers 1020 to 1021.

In the step 12004, when the memory rank power management program 2114 changes the power rank zone 6020 to the inactive state via the memory controllers 1020 to 1021, the memory rank power management program 2114 updates the power state 6040 of the power rank zone 6020.

After the step 12005, the memory rank power management program 2114 repeats the steps 12002 to 12005 for each of the power rank zones (6081 to 6082, 6091 to 6092, and 6101 to 6102) (12006). After completing processing for all the power rank zones 6020, processing is different for the case where the memory rank power management program 2114 is executed periodically (12007), and the case where it is called directly (12008).

Next, the processing of the memory rank power management program 2114 when the memory rank power management program 2114 is executed periodically will be described using FIG. 12B. The processing of the memory rank power management program 2114 when the memory rank power management program 2114 is called directly will be described using FIG. 12C.

Figure 12B:
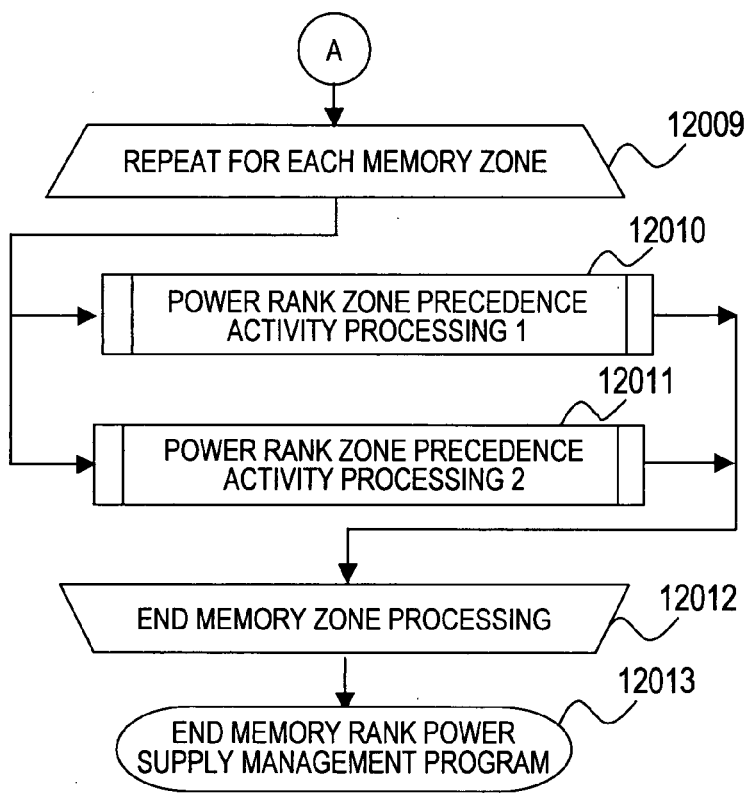
FIG. 12B is a flow chart of a memory rank power management program when the memory rank power management program according to the first embodiment of the invention is executed periodically.

FIG. 12B is a flow chart of the memory rank power management program 2114 in case the memory rank power management program 2114 according to the first embodiment of the invention is executed periodically.

When the memory rank power management program 2114 is executed periodically (12007), the memory rank power management program 2114 repeats the power rank zone precedence activity processing 1 (12010) or the power rank zone precedence activity processing 2 (12011) for each of the memory zones 6080 to 6100 (12009). For all the memory zones, in case of which the step 12010 or step 12011 is executed (12012), the memory rank power management program 2114 is completed (12013).

The activity processing of the power rank zones is set beforehand to execute the power rank zone precedence activity processing 1 (12010). Using an input device such as the keyboard 1190 with which the computer 1000 is provided, the manager can change the setting so that the power rank zone precedence activity processing 2 (12011) is executed by the power rank zone activity processing from the memory management control interface 2115. The setting may also be modified to execute the power rank zone precedence activity processing 2 (12011) in power rank zone activity processing from the memory management control interface 2115 via the network 1500 from the computer 1600 in a remote location.

The power rank zone precedence activity processing 1 will now be described referring to FIG. 13A. The power rank zone precedence activity processing 2 will be described referring to FIG. 13B.

Figure 12C:
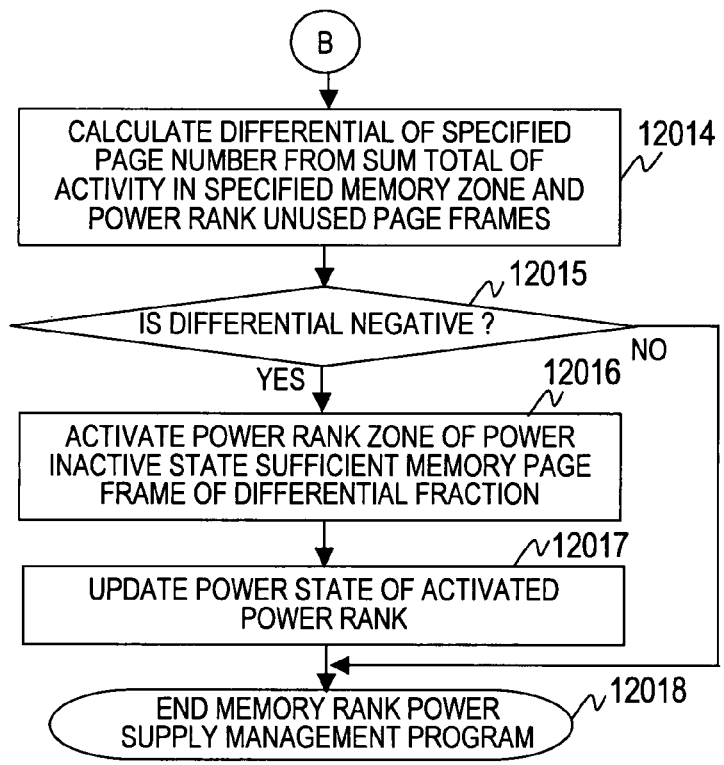
FIG. 12C is a flow chart of a memory rank power management program when the memory rank power management program according to the first embodiment of the invention is directly called and executed.

FIG. 12C is a flow chart of the memory power supply management program 2114 in case of which the memory power supply management program 2114 according to the first embodiment of the invention is called directly.

When the memory power supply management program 2114 is called directly, for example, the memory rank power management program 2114 is registered in a hook function of the memory page frame allocation management program 2112 (11003), and may be executed as a hook function (11004).

First, the memory rank power management program 2114 calculates the sum total value of the number of memory page frames 6050 of the power rank zone 6020 for which the power state 6040 of the memory zone-power rank zone state management table 2120 of the specified memory zone 6000 is the active state, and calculates a difference value from the number of pages specified as the sum total value by the memory management program 2110 in the step 11000 (12014). This is to determine whether or not it is necessary to newly put a power rank zone into the active state.

After the step 12014, the memory power supply management program 2114 determines whether or not the difference is negative (12015). When the difference of the memory power supply management program 2114 is negative, it is determined that the number of memory page frames in the active state is insufficient by the number of memory page frames having the absolute value of the difference, and it is determined that it is newly necessary to change the power rank zone to the active state, whereas in case of which it is determined that the difference is not negative, it is determined that the number of memory page frames in the active state is larger than the specified number of memory page frames, and it is determined that it is not necessary to newly change the power rank zone to the active state. When the difference value is determined to be negative, the memory power supply management program 2114 selects the power rank zone 6020 whose power state 6040 is the inactive state starting from small power rank zone size 6030 to satisfy the number of memory page frames corresponding to this difference. The memory power supply management program 2114 then changes the power state of the memory ranks 1031 to 1062 of the selected power rank zone 6020 to the active state (12016). When it is determined that the difference value is not negative, the routine proceeds to a step 12018.

After the step 12016, the memory power supply management program 2114 updates the power state 6040 of the memory zone power rank zones state management table 2120 for the power rank zone 6020 activated in the step 12016 (12017).

After the step 12017, or when it is determined that the difference value is not negative in the step 12015, since it is not necessary to newly change the power rank zone to the active state, the memory rank power management program 2114 is completed (12018).

Figure 13A:
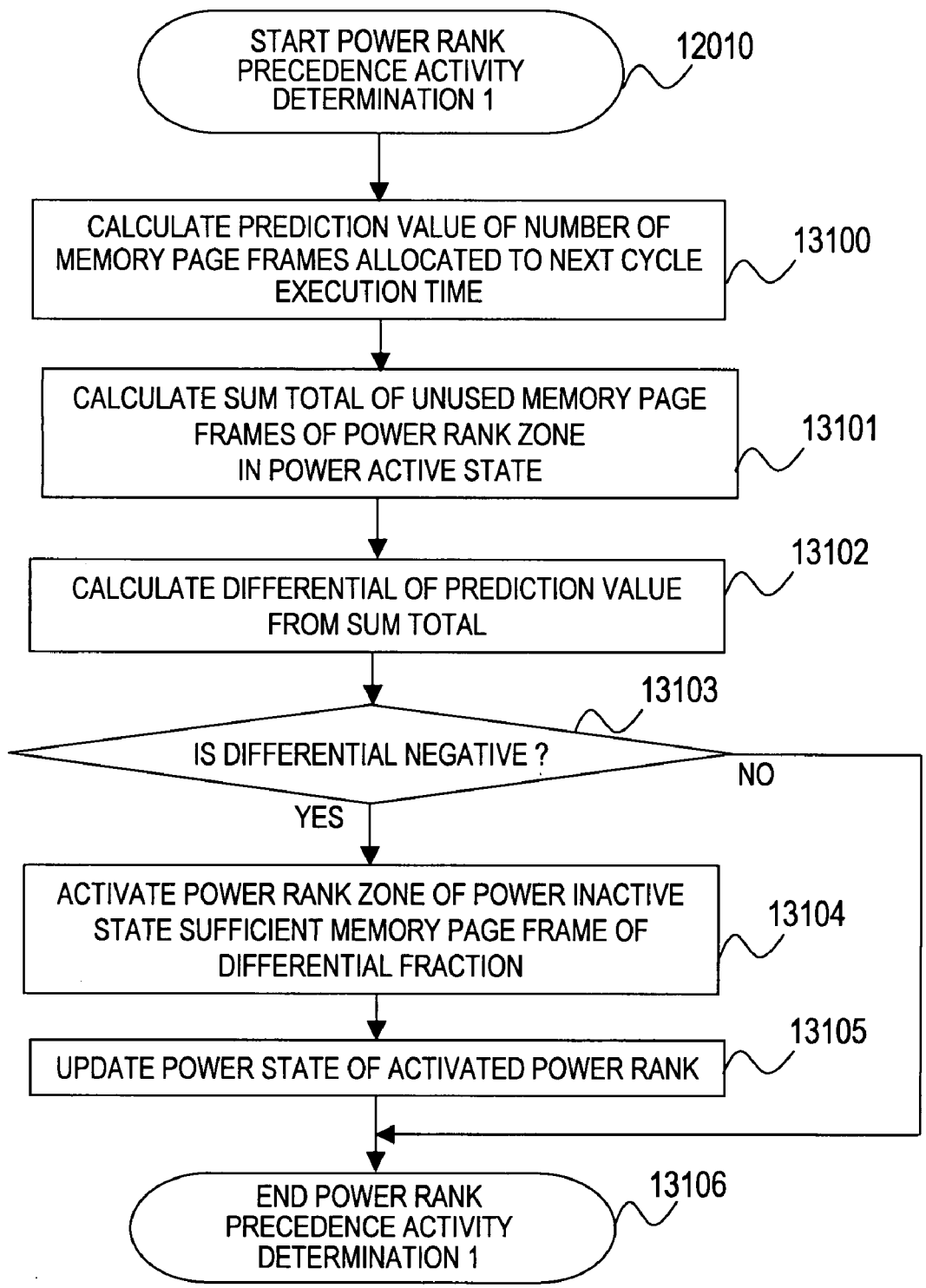
FIG. 13A is a flow chart of a power rank zone precedence activity processing 1 according to the first embodiment of the invention.

FIG. 13A is a flow chart of the power rank zone precedence activity processing 1 (12010) of the memory rank power management program 2114 according to the first embodiment of the invention. The power rank zone precedence activity processing 1 (12010) first calculates the predicted value of the number of memory page frames which the memory rank power management program 2114 allocates to each software until they are next allocated periodically (13100). For example, the predicted value is calculated from the periodic execution time at which the memory power management program is executed, and the first time differential 6060 and the second time differential 6070 of the number of used memory page frames of the memory zone-power rank zone state management table 2120.

After the step 13100, the memory power supply management program 2114 calculates the sum total value of the number of memory page frames 6050 of the power rank zone 6020 whose power state 6040 in the memory zone power rank zone state management table 2110 is the active state (13101).

After the step 13101, the memory power supply management program 2114 calculates the difference of the sum total value calculated at step 13101, and the predicted value calculated at step 13100 (13102).

After step 13102, the memory power supply management program 2114 determines whether or not the difference value calculated in the step 13102 is negative (13103). Specifically, it is determined whether or not the sum total value of the number of unused memory page frames which are in the active state, is less than the predicted value.

When the difference is determined to be negative (i.e., when the sum total value of the number of unused memory page frames which are in the active state, is less than the predicted value), the processing of the step 13014 and step 13105 is executed so as to put the memory page frames into an active state in advance.

The step 13104 and step 13105 are identical to the step 12016 and step 12017, respectively.

After the step 13105 is completed, in case of which it is determined that the difference is not negative in the step 13103 (when there are more memory page frames which are in the active state than the predicted value), it is not necessary to put the page frames in an active state in advance, so the power rank zone precedence activity processing 1 is completed (12018).

Figure 13B:
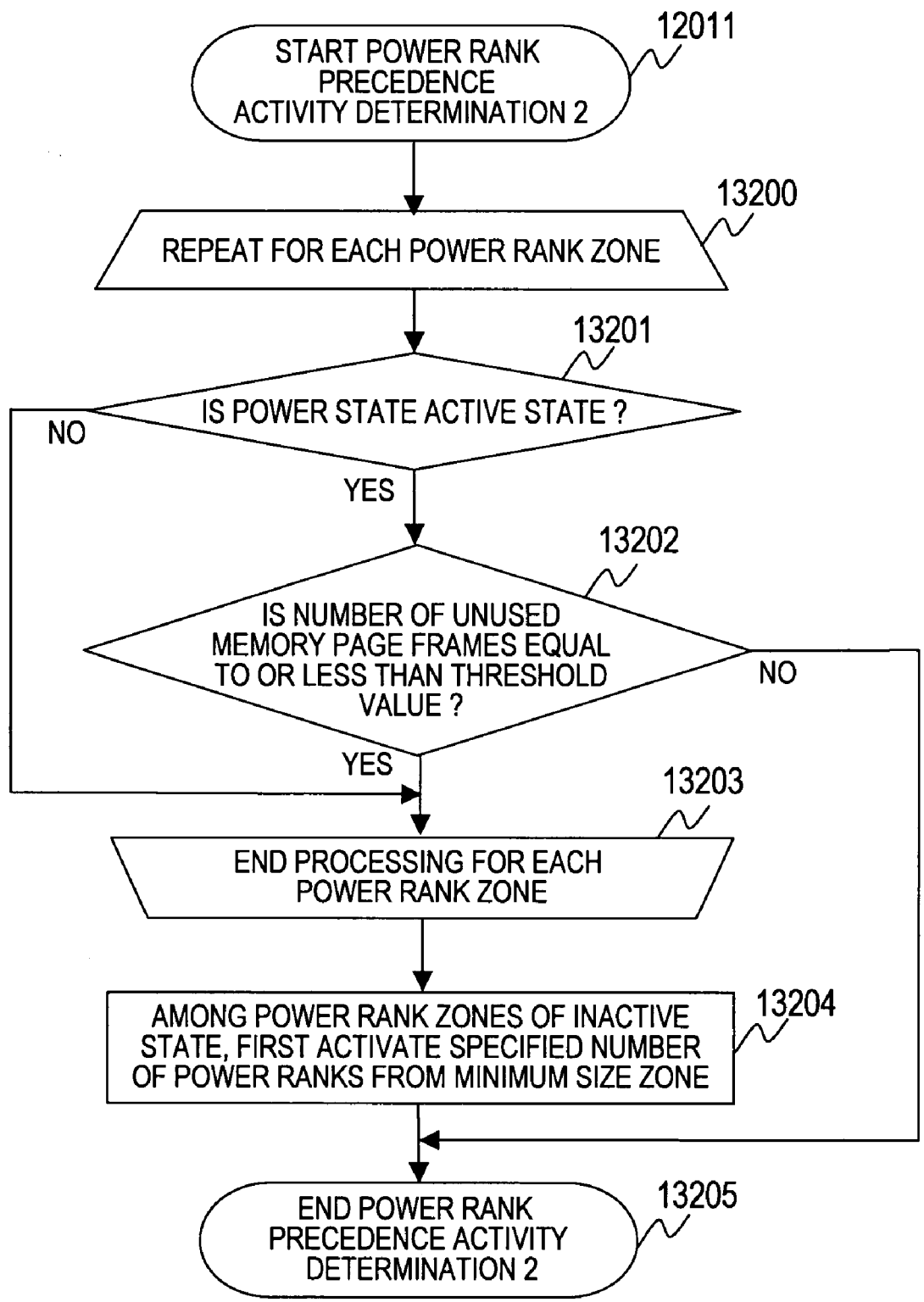
FIG. 13B is a flow chart of a power rank zone precedence activity processing 2 according to the first embodiment of the invention.

FIG. 13B is a flow chart of the power rank zone precedence activity processing 2 (12011) according to the second embodiment of the invention.

The power rank zone precedence activity processing 2 (12011) first repeats the processing of the step 13201 and the processing of the step 13202 for the power rank zones (6081 to 6082, 6091 to 6092, 6101 to 6102) (13200).

First, the memory power supply management program 2114 determines whether or not the power state 6040 is the active state (13201).

When the power state 6040 of the selected power rank zones 6020 is determined to be the active state, it is determined whether or not the number of memory page frames 6050 is more than a threshold value (13202). This threshold value is set beforehand at a percentage based on the power rank zone size 6030 in the power rank zone 6020. The manager executes setting or changes from the memory management control interface 2115 using an input device such as the keyboard 1190 with which the computer is provided. The manager may also perform settings or changes from the memory management control interface 2115 via the network 1500 from the computer 1600 in a remote location.

When it is determined that the number of memory page frames 6050 is less than the threshold value in the step 13202, and when it is determined that the power state 6040 is the inactive state in the step 13201, the processing of the step 13201 and processing of step 13202 are repeated for each power rank zone (6081 to 6082, 6091 to 6092, 6101 to 6102) (13203). After the processing of the step 13201 and processing of step 13202 are executed for all the power rank zones (6081 to 6082, 6091 to 6092, 6101 to 6102), the routine proceeds to the step 13203.

After the step 13203, the memory power supply management program 2114 selects the power rank zones 6020 whose power state 6040 is the inactive state for a specified number thereof in order or small power rank zone size 6030. The selected power rank zones (6081 to 6082, 6091 to 6092, 6101 to 6102) are changed to the active state, and the power state 6040 is updated (13204). As for this specified number, "1" is set beforehand as a default value.

The manager sets or changes the value of a specified number from the memory management control interface 2115 using an input device such as the keyboard 1190 with which the computer 1000 is provided. The value of the specified number may also be set or changed from the memory management control interface 2115 via the network 1500 from the computer 1600 in a remote location.

After the step 13204, or when it is determined that the number of memory page frames 6050 is more than a threshold value (13202), the power rank zone precedence activity processing 2 (12011) is completed.

Figure 14:
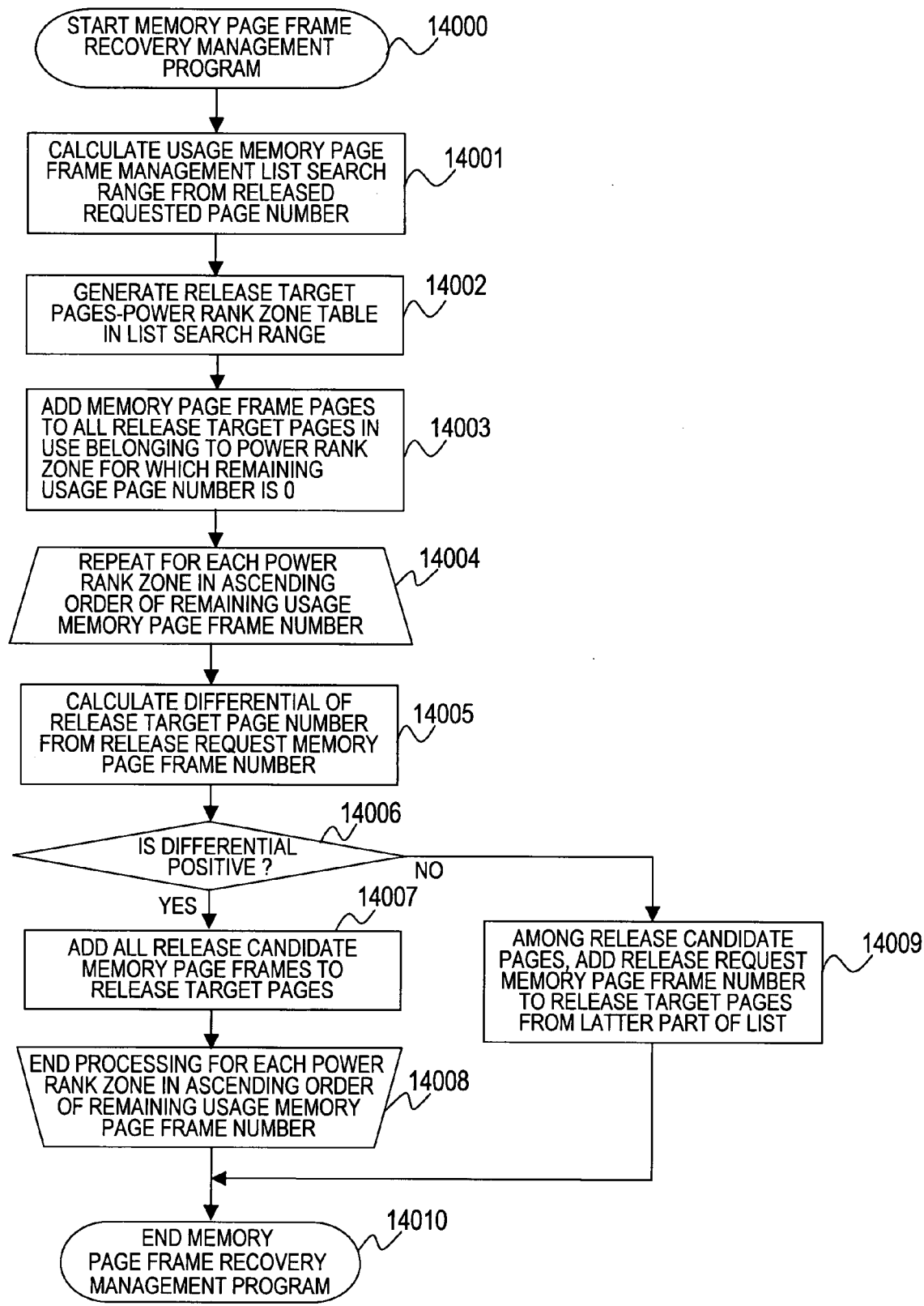
FIG. 14 is a flow chart of a memory page frame recovery management program according to the first embodiment of the invention.

FIG. 14 is a flow chart of the memory page frame recovery management program 2113 according to the first embodiment of the invention.

The memory page frame recovery management program 2113 is called for example by specifying the number of memory page frames recovered by the memory management program 2110, i.e., the number of memory page frames released from software allocation of memory page frames allocated to each software (14000).

The number of released memory page frames specified by this memory management program, is referred to as the number of release request memory page frames. There may be singular or plural of the specified number of page frames.

First, the memory page frame recovery management program 2113 calculates the area for searching the used memory page frame management list 8000 from the specified number of release request memory page frames, by the memory management program 2110 (14001). Normally, memory page frames which have not been used recently are released. Therefore, the memory page frames to release are searched from the end of the used memory page frame management list 8000, which is an LRU list. The range for searching the memory page frame management list 8000 is taken for example as the value obtained by multiplying the number of release request memory page frames by a search coefficient. The search coefficient is set beforehand as "1." The manager may set or change the search coefficient from the memory management control interface 2115 using an input device such as the keyboard 1190 with which the computer 1000 is provided. Also, setting or change may be performed from the memory management control interface 2115 via the network 1500 from the computer 1600 in a remote location.

After the step 14001, the memory page frame recovery management program 2113 creates the power rank zone release candidate page table 2160 in a search range of the memory page frame management list 8000 (14002). Specifically, the memory page frame recovery management program 2113 registers the power rank zones to which the memory page frames included in the search range belong, in the power rank zone 9000.

Further, the memory page frame recovery management program 2113 registers all the memory page frame numbers including each power rank zone in a number of release candidate memory pages 9100. Further, the memory page frame recovery management program 2113 registers the difference between the number of release candidate memory page frames 9100 of each power rank zone and the number of memory page frames which are not used in each power rank zone, in the number of remaining memory page frames 9200 from the number of memory page frame including a power rank zone. Specifically, when allocation of the memory page frames of the release candidate target memory page frame 9100 of each power rank zone is released, the number of memory page frames currently used by each software is registered in the number of remaining memory page frames 9200.

After the step 14002, the memory page frame recovery management program 2113 takes all the used memory page frames including the power rank zone 9000 for which the remaining number of memory page frames 9200 is 0, as release target memory page frames (14003).

This is because, in case of which the number of remaining memory page frames 9200 is 0, all the memory page frames including this power rank zone are memory page frames which are not used by the software.

After the step 14003, the memory page frame recovery management program 2113 repeats the processing of the step 14005 to step 14007 for each power rank zone 9000 in ascending order of the number of remaining memory page frames 9200 (14004).

First, the memory page frame recovery management program 2113 calculates the difference between the number of release request memory page frames and number of release candidate memory page frames (14005).

Next, the memory page frame recovery management program 2113 determines whether or not the difference calculated in the step 14005 is positive (14006).

Specifically, it is determined whether or not there are less release candidate memory pages than the number of release request memory page frames.

When the difference value is determined to be positive (when there are less release candidate memory pages than the number of release request memory page frames), all the release candidate memory page frames 9100 including the selected power rank zones 9000 are added to a release candidate page (14007). Next, the processing of the steps 14005 to 14007 is repeated for each power rank zone 9000 in ascending order of the number of remaining memory page frames 9200 (14008).

When a difference is determined to be negative (when there are more number of release candidate memory pages than the number of release request memory page frames), among the release candidate memory page frames, a part sufficient the number of release request memory page frames is added to the release candidate page giving priority from the end of the used memory page frame management list 8000 (14009).

After the step 14009, after repeating the steps 14005 to 14007 for every power rank zone 9000 in ascending order of the number of remaining memory page frames 9200 (14008), the memory page frame recovery management program is completed (14010). As described above, this embodiment is a memory management system which reduces the power consumed by the memory with which the computers 1000 to 1001 and the basic system software 2100 (operating system etc.) are coordinated. This embodiment takes control of the memories 1030 to 1060 which reduces the power consumed by the memories 1030 to 1060 into account, and the basic system software 2100 performs continuous control of the power mode of the memories 1030 to 1060 by allocating memory resources to the software and releasing this allocation in power rank zones.

Due to this, the fragmentation which occurs when plural memory ranks 1031 to 1062 are spanned, wherein the area used by the memories 1030 to 1060 is a unit whereby the power consumed by the memories 1030 to 1060 can be independently controlled, can be suppressed. Moreover, in response to the method (memory zone management) of managing the memories 1030 to 1060 in the basic system software 2100, the power consumed by the memories 1030 to 1060 can practically, surely and efficiently be largely reduced. Further, by activating the power mode of the required memory ranks 1031 to 1062 first, and concealing the latency which occurs during power mode change-over, the power consumed by the memories 1030 to 1060 can be reduced without affecting the performance with which the memories 1030 to 1060 of the CPUs 1010 to 1011 are accessed.

Second embodiment

A second embodiment of the invention will now be described referring to FIGS. 15 to 17.

In the second embodiment of the invention, the case of a power consumption memory control different from that of the first embodiment will be described when the computers 1000 to 1001 form a Numa system.

A Numa system is a system wherein the computer 1000 is connected to another computer 1001 via a node controller 1090 and the internode bus 1160, and the CPUs 1010 to 1011 of each computer 1000 to 1001 can access the memory of each computer 1000 to 1001. In general, the speed with which the CPUs 1010 to 1011 access the memories 1030 to 1060 of the same computer, is faster than the speed with which the CPUs 1010 to 1011 access the memories 1030 to 1060 of another computer.

In the first embodiment, the memory management program 2110 of the basic system software 2100 manages the memory 1030 to 1060 resources by the zones of the memories 1030 to 1060, and the memory 1030 to 1060 resources are allocated to the software and released. Also in a Numa system, power consumed by the memories 1030 to 1060 can be reduced with the same composition as the memory management program 2110 of the first embodiment by forming a memory zone for each computer node 1000 to 1001.

The same symbols are assigned to the same elements of the composition as that of the first embodiment, and their description is omitted.

Figure 15:
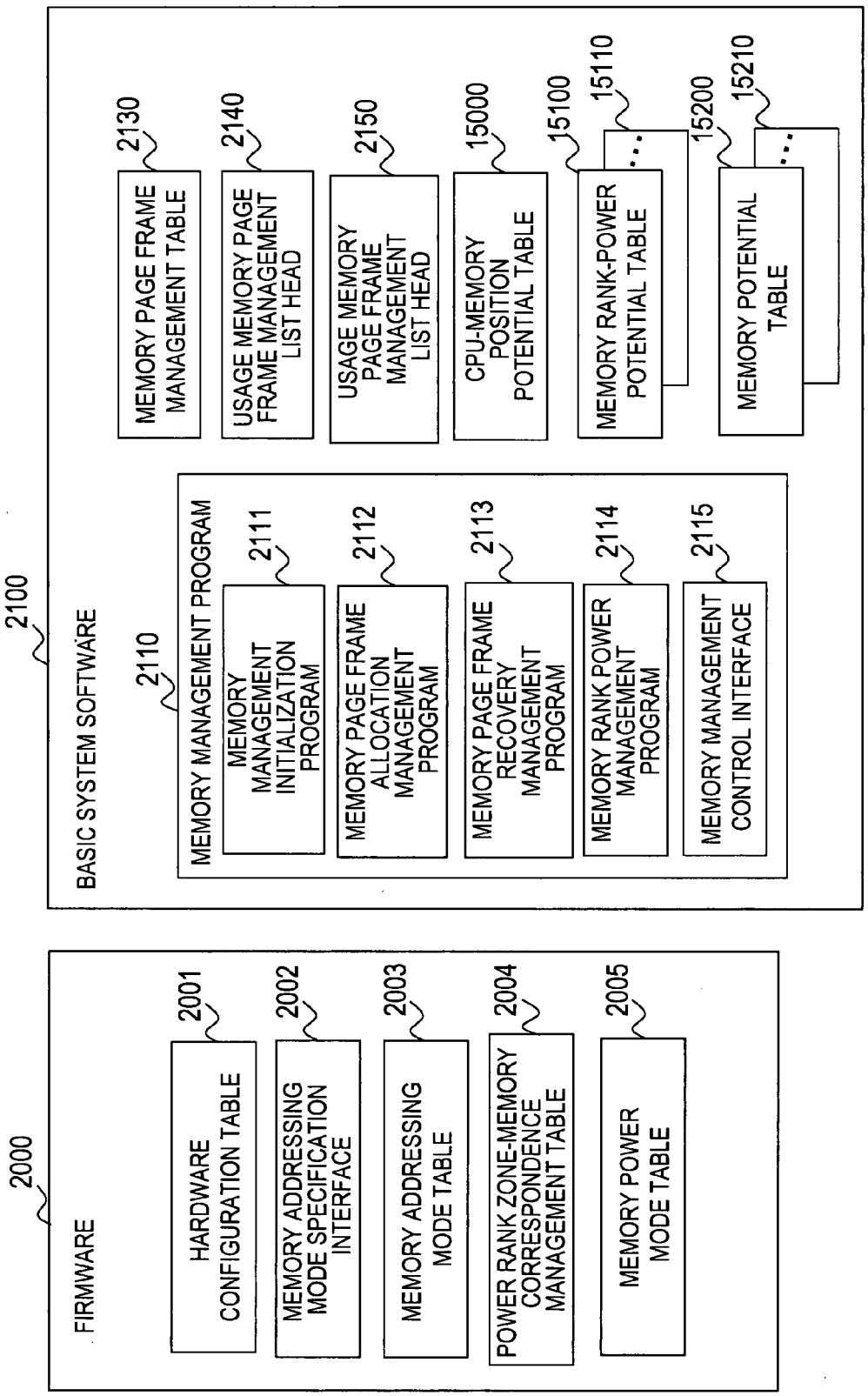
FIG. 15 is a schematic diagram of a firmware and basic system software according to a second embodiment of the invention.

FIG. 15 is a schematic diagram of the firmware 2000 and the basic system software 2100 according to the second embodiment of the invention.

The firmware 2000 and the basic system software 2100 run on a computer 1000 to 1001.

Instead of the first memory zone power rank zone state management table 2120 and power rank zones release candidate memory page frame management table 2160 of the basic system software 2100 of the first embodiment, the basic system software 2100 has a CPU-memory position potential table 15000, memory rank power potential tables 15100 to 15110, and memory potential tables 15200 to 15210.

The CPU-memory position potential table 15000 shows the access delay (latency) generated according to the distance between the CPUs 1010 to 1011 and each memory 1030 to 1060 with which the computers 1000 to 1001 are provided. The memory rank power potential tables 15100 to 15110 show the memory ranks 1031 to 1062 of the memories 1030 to 1060 and the power state of each of the memory ranks 1031 to 1062 with which the computers 1000 to 1001 are provided. Memory potential tables 15200 to 152100 show the access delay (latency) to the memory ranks 1031 to 1062 generated according to position and power for the CPUs 1010 to 1011. The remaining construction is identical to that of the first embodiment.

Figures 16A, 16B:
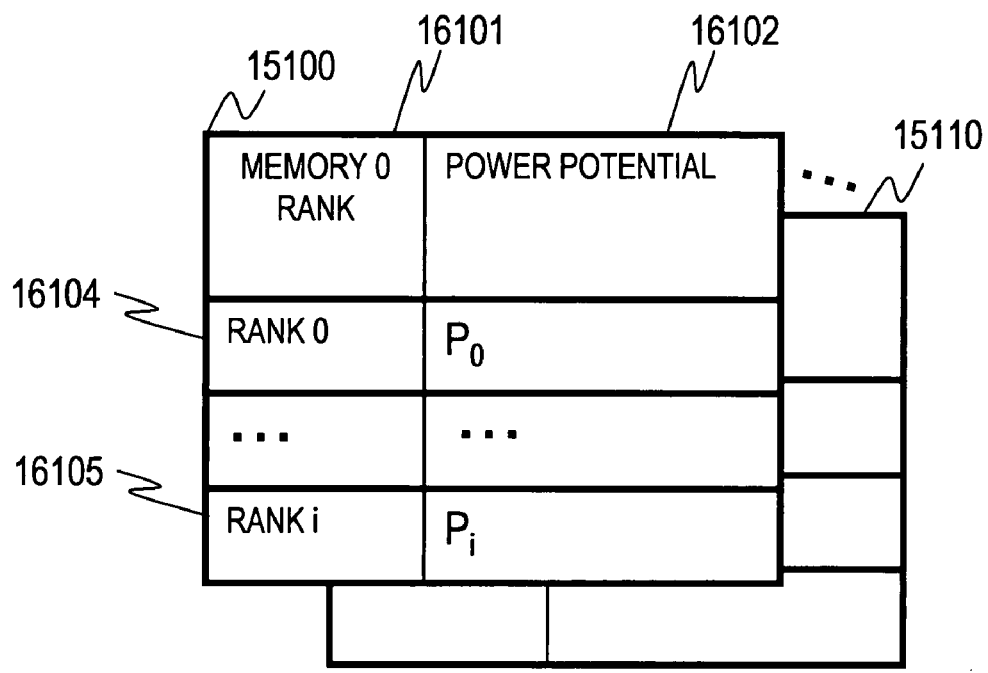
FIG. 16A is a schematic diagram showing a CPU-memory position potential table according to a second embodiment of the invention.
FIG. 16B is a schematic diagram showing a memory rank power potential table according to a second embodiment of the invention.

FIG. 16A is a schematic diagram showing the CPU-memory position potential table 15000 according to the second embodiment of the invention.

The CPU-memory position potential table 15000 is managed by the basic system software 2100.

This shows the position potential to the memories 1010 to 1011 registered in the row entries 16004 to 16006 from the CPUs 1010 to 1011 registered in the line entries 16001 to 16003. The position potential shows the access delay generated according to the distance between the CPUs 1010 to 1011 and the memories 1030 to 1060. For example, the position potential from the CPU0 to the memory 0 is 0, and access from the CPU0 to the memory 0 is delayed. This shows that the position potentials from the CPU to the memory m and from the CPU0 to the memory n, are $D_{0m}$ and $D_{0n}$ respectively. This CPU and memory are provided to computers n (1000 to 1001) which form a Numa system.

The content of the CPU-memory position potential table 15000 is set by the memory management initialization program 2111 when the computers 1000 to 1001 are started. The value of each position potential is a value which is, for example, proportional to the distance between the CPUs 1010 to 1011 and the memories 1030 to 1060 which is normally provided by the hardware configuration table 2001 of the firmware 2000. In other words, the memories 1030 to 1060 are separated from the CPU s 1010 to 1011 more, the higher the position potential is, and there is a large delay in access to the memories 1030 to 1060 from the CPUs 1010 to 1011.

FIG. 16B is a schematic diagram showing the memory rank power potential tables 15100 to 15110 according to the second embodiment of the invention.

The memory rank power potential tables 15100 to 15110 are managed by the basic system software 2100, and there is the same number of memory rank power potential tables 15100 to 15110 as the number of memories 1030 to 1060 with which the computers 1000 to 1001 are provided. The memory rank-power potential table 15100 is a table showing the memory rank 16101 and the power potential 16102 of the memory 0. The memory rank power potential tables 15100 to 15110 have the memory rank 16101 and the power potential 16102 showing the rank of the corresponding memories 1030 to 1060.

The content of the memory-ranks power potential table 15100 to 15110 is set by the memory management initialization program 2111 when the computers 1000 to 1001 start. Also, it is updated by the memory management program 2120 while the computers 1000 to 1001 are running. The value of each power potential 16102 is a value which is inversely proportion to the power consumption value 5100 of each power mode 5000 provided for example by the memory power mode table 2005 of the firmware 2000. In other words, the power consumed by the memory ranks 1031 to 1062 is smaller, and the delay with which the memory ranks can be put into the active state wherein read/write can be executed, is larger, the higher the value of the power potential 16102 is. Therefore, the delay in accessing the memories 1030 to 1060 from the CPUs 1010 to 1011 is larger, the higher the value of the power potential 16102 is. Also, the memory rank power potential table 15100 manages the power potential for the memory-ranks 0-i (1031 to 1032) of the corresponding memory 0 (1030).

Figure 16C:
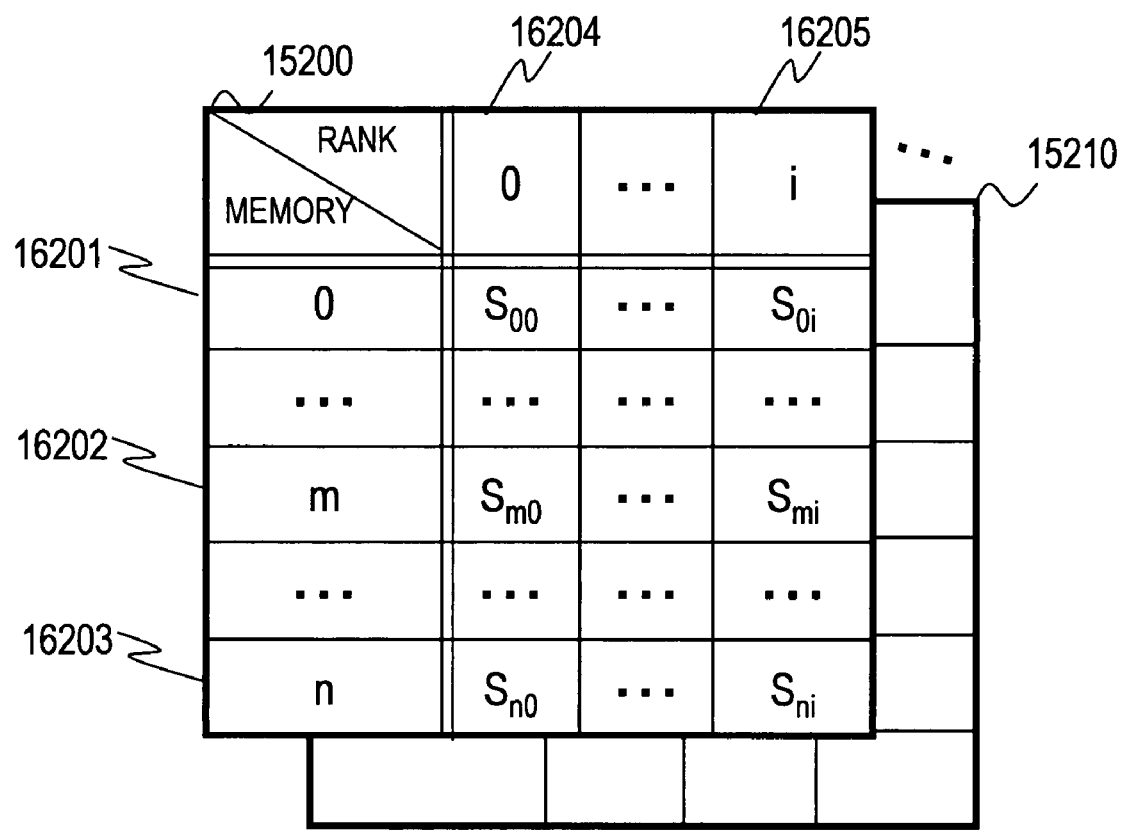
FIG. 16C is a schematic diagram showing a memory potential table according to a second embodiment of the invention.

FIG. 16C is a schematic diagram showing the memory potential tables 15200 to 15210 according to the first embodiment of the invention.

The memory potential tables 15200 to 15210 are managed by the basic system software 2100, and there are as many tables as the number of CPUs 1010 to 1011 with which the computers 1000 to 1001 are provided.

The memory potential tables 15200 to 15210 show the memory potential of the memory ranks of the memories of the lines 16201 to 16203, and the memories of the rows 16004 to 16006 in the corresponding CPU.

The content of the memory potential tables 15200 to 15210 is set by the memory management initialization program 2111 when the computers 1000 to 1001 start. Also, it is updated by the memory management program 2120 while the computers 1000 to 1001 are running.

The value of each memory potential is computed from the CPU-memory position potential table 15000 and the memory rank power potential tables 15100 to 15110. Specifically, for example, the value of the memory potential is the sum of, a value obtained by multiplying the position potential (16004 to 16006) for the memory with which the computers 1000 to 1001 are provided by a position potential coefficient ($\alpha$), and a value obtained by multiplying the power potential (16102) of each memory by a position potential coefficient ($\beta$), for the CPU-memory position potential table 15000 for each of the CPU 1010 to 1011(16001 to 16003). The position potential coefficient ($\alpha$) and the power potential coefficient ($\beta$) are set beforehand as default values, respectively. The manager can set or change the position potential coefficient ($\alpha$) and power potential coefficient ($\beta$) from the memory management control interface 2115 using the input device of the keyboard 1190 with which the computer 1000 is provided. The manager may also set or change the position potential coefficient ($\alpha$) and power potential coefficient ($\beta$) from the memory management control interface 2115 via the network 1500 from a computer in a remote location.

Figure 17:
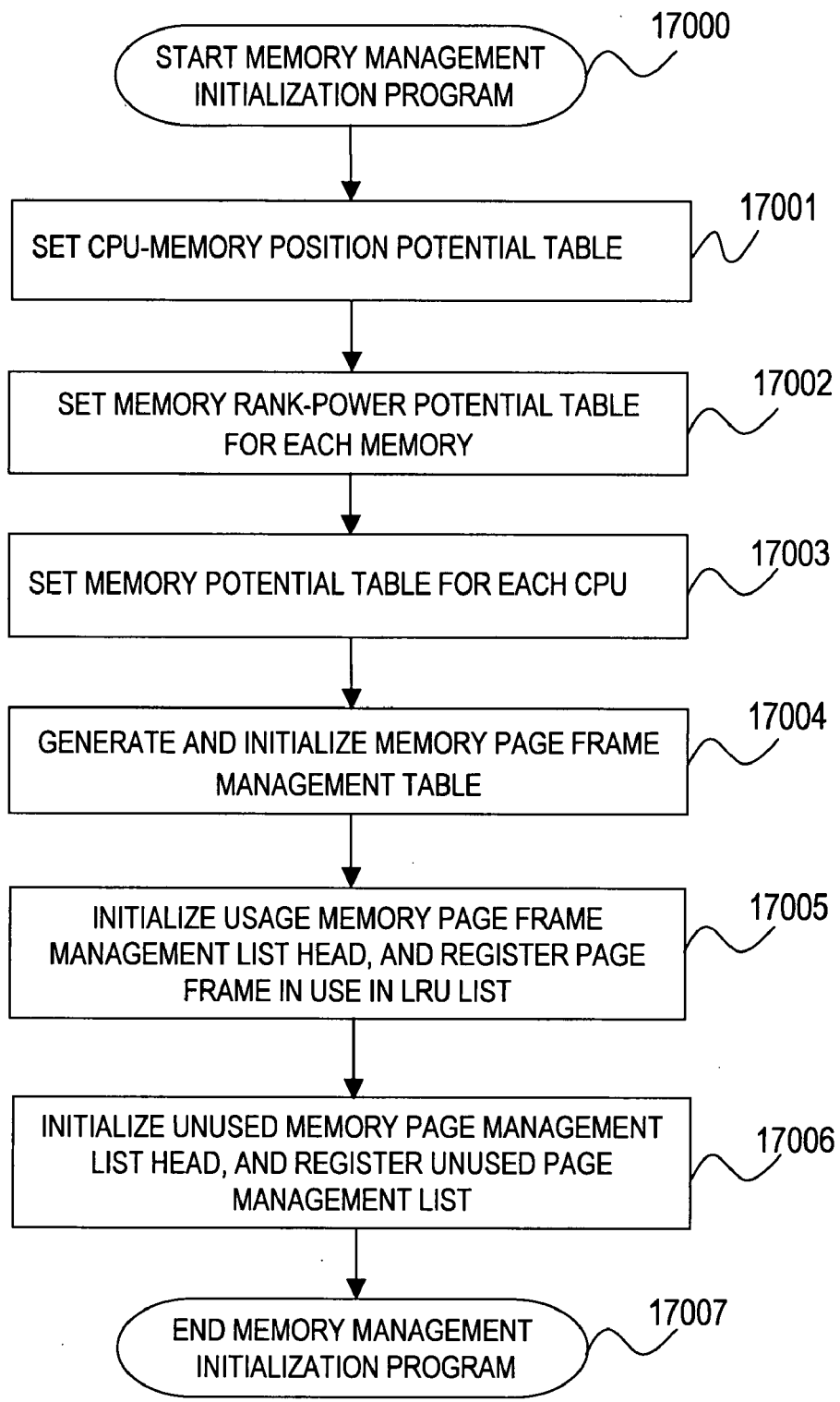
FIG. 17 is a flow chart of an initialization program according to a second embodiment of the invention.

FIG. 17 is a flow chart of the memory management initialization program 2111 according to the second embodiment of the invention.

The initialization program is executed when the computers 1000 to 1001 start (17000).

First, the memory management initialization program 2111 sets the CPU-memory position potential table 15000 (17001).

Next, the memory management initialization program 2111 sets the memory rank power potential table 17100 for each memory 1030 to 1060 with which the computer 1000 and computer 1001 are provided (17002).

After the step 17002, the memory management initialization program 2111 sets the memory potential tables 15200 to 15210 for each of the CPUs 1010 to 1011 with which the computer 1000 and 1001 are provided (17003). The method of computing the potential value of each potential table (15000, 15100 to 15110, 15200 to 15210), is identical to that described in FIG. 16.

The steps 17004 to 17007 after the step 17002 are identical to the processing of the steps 10010 to 10012 described in the first embodiment. After the step 17007, the memory management initialization program 2111 is completed.

The memory page frame allocation management program 2112 is called for example when the memory management program 2110 specifies the CPUs 1010 to 1001 of the Numa computers 1000 to 1001 on which the software which required a memory page frame allocation runs, and the number of memory page frames.

The memory allocation management program 2112 refers the memory potential tables 15200 to 15210 corresponding to the specified CPUs 1010 to 1011, and allocates memory page frames sufficient the specified number of memory page frames starting from the memory rank for which the value of the memory potential is a minimum.

Also, the memory allocation management program 2112 updates the used memory page frame management list 8000 and the unused memory page frame management list 8100.

Since the position potential coefficient ($\alpha$) and a power potential coefficient ($\beta$) can be changed by the manager, it can be selected whether to allocate memory pages giving priority to the position potential, or to allocate memory pages giving priority to the power potential.

Also, since the memory rank with the minimum memory potential value, i.e., the memory rank with the smallest latency, is given priority, decrease in the access performance of the memory can be suppressed.

The memory page frame recovery management program 2113 is called by example specifying a number of memory page frames to be recovered, by the memory management program 2110. A release target memory page frame is searched from the list end of the used memory page frame management list 8000 which is a LRU management list.

The memory rank power management program 2114 is for example executed periodically, and updates the memory-rank power potential tables 15100 to 15110.

The memory rank power management program 2114 then updates the memory potential tables 15200 to 15210.

Hence, also according to the second embodiment, and particularly in a Numa computer configuration, the power consumed by the memory can be reduced while maintaining access performance to the memories 1030 to 1060 from the CPUs 1010 to 1011.

While the present invention has been described in detail and pictorially in the accompanying drawings, the present invention is not limited to such detail but covers various obvious modifications and equivalent arrangements, which fall within the purview of the appended claims.

What is claimed is:

1. A memory management method performed in a computer having at least one processor which executes basic system software, firmware and application software, a memory which is a storage area, and a memory controller coupled to the memory, wherein:
   the memory controller controls a memory addressing which defines an address in the memory, a memory access from the processor to the memory and a memory power state,
   the memory storage area is an area which can be assigned to the basic system software, the firmware and the application software, the storage area is divided into memory ranks which are units whose power can be independently controlled by the memory controller,
   a supplied power state of the memory is controlled, for each memory rank, to one of an active state in which the storage area included in the memory rank can be accessed from the processor, and an inactive state in which access from the processor to the storage area is delayed;
   the basic system software prevents fragmentation in which the allocated storage area spans a plurality of memory ranks, puts the power state of a memory rank which does not include the allocated storage area into the inactive state via the memory controller, and puts the power state of a memory rank which includes a storage area required for the allocation first into the active state, and
   the basic system software calculates a prediction value of an allocation area, and puts the power state of the memory rank into the active state first based on the predicted value.

2. The memory management method according to claim 1, wherein the basic system software determines whether the unallocated storage area is included in the memory rank in the active state, and allocates an unallocated storage area included in a memory rank in the active state to the basic system software, firmware and application software.

3. The memory management method according to claim 1, wherein the basic system software selects the memory rank including a small allocable size from among memory ranks whose power state is the inactive state, and puts the selected memory rank into the active state first via the memory controller.

4. The memory management method according to claim 1, wherein:
   the basic system software manages a potential table for each memory rank of each memory showing a memory potential value which is the sum of a value obtained by multiplying a delay time whereby said processor accesses the memory by a predetermined position potential coefficient, and a value obtained by multiplying a power potential showing the power state of the memory rank by a predetermined power potential coefficient; and
   the basic system software selects the memory rank of the memory for which the memory potential value is a minimum by referring to the potential table, and allocates an unallocated storage area included in the selected memory rank to the basic system software, the firmware and the application software.

5. A computer readable medium storing a program executed by a computer which executes a sequence for memory management, the program being executed by the computer comprising at least one processor which executes basic system software, firmware and application software, a memory which is a storage area, and a memory controller coupled to the memory,
   wherein the memory controller controls a memory addressing which defines an address in the memory, a memory access from the processor to the memory and a memory power state,
   wherein the memory storage area is an area which can be allocated to the basic system software, the firmware and the application software, the storage area is divided into memory ranks which are units whose power can be independently controlled by the memory controller,
   wherein a supplied power state of the memory is controlled, for each memory rank, to one of an active state in which the storage area included in the memory rank can be accessed from the processor, and an inactive state in which access from the processor to the storage area is delayed, and
   wherein the program including the sequence of instructions that, when the program is executed, causes the computer to:
   prevent fragmentation in which the allocated storage area spans a plurality of memory ranks;
   put the power state of a memory rank which does not include the allocated storage area into the inactive state via the memory controller;
   put the power state of a memory rank which includes a storage area required for said allocation first into the active state;
   calculate a prediction value of an allocation area; and
   put the power state of the memory rank into the active state first based on the predicted value.

6. The computer readable medium storing the program according to claim 5, wherein the program including the sequence of instructions that causes the computer to:
   determine whether the unallocated storage area is included in the memory rank in the active state; and
   allocate an unallocated storage area included in a memory rank in the active state to the basic system software, firmware and application software.

7. The computer readable medium storing the program according to claim 5, wherein the program including the sequence of instructions that causes the computer to:
   select the memory rank including a small allocable size from among memory ranks whose power state is the inactive state; and
   put the selected memory rank into the active state first via the memory controller.

8. The computer readable medium storing the program according to claim 5, wherein the program including the sequence of instructions that causes the computer to:

manage a potential table for each memory rank of each memory showing a memory potential value which is the sum of a value obtained by multiplying a delay time whereby said processor accesses the memory by a predetermined position potential coefficient, and a value obtained by multiplying a power potential showing the power state of the memory rank by a predetermined power potential coefficient; and select the memory rank of the memory for which the memory potential value is a minimum by referring to the potential table; and allocate an unallocated storage area included in the selected memory rank to the basic system software, the firmware and the application software.

* * * * *